(12) United States Patent
Herb et al.

(10) Patent No.: US 6,693,620 B1
(45) Date of Patent: Feb. 17, 2004

(54) THRESHOLD ADDRESSING OF ELECTROPHORETIC DISPLAYS

(75) Inventors: Craig A. Herb, Medford, MA (US); Ian D. Morrison, Acton, MA (US); Andrew L. Loxley, Somerville, MA (US)

(73) Assignee: E Ink Corporation, Cambridge, MA (US)

( * ) Notice: Subject to any disclaimer, the term of this patent is extended or adjusted under 35 U.S.C. 154(b) by 0 days.

(21) Appl. No.: 09/564,125

(22) Filed: May 3, 2000

Related U.S. Application Data

(60) Provisional application No. 60/132,303, filed on May 3, 1999.

(51) Int. Cl.⁷ .................................. G09G 3/34
(52) U.S. Cl. ..................... 345/107; 345/84; 345/85
(58) Field of Search ................... 345/48, 84, 85, 345/107, 173; 204/606; 347/112; 359/296; 427/58

(56) References Cited

U.S. PATENT DOCUMENTS

| | | |
|---|---|---|
| 2,800,457 A | 7/1957 | Green et al. |
| 3,036,388 A | 5/1962 | Tate |
| 3,384,488 A | 5/1968 | Tulagin et al. |
| 3,406,363 A | 10/1968 | Tate |
| 3,460,248 A | 8/1969 | Tate |
| 3,585,381 A | 6/1971 | Hodson et al. |
| 3,612,758 A | 10/1971 | Evans et al. |
| 3,668,106 A | 6/1972 | Ota |

(List continued on next page.)

FOREIGN PATENT DOCUMENTS

| | | |
|---|---|---|
| EP | 0 186 710 A1 | 7/1986 |
| EP | 0 268 877 A3 | 6/1988 |
| EP | 0 268 877 A2 | 6/1988 |
| EP | 0 281 204 A2 | 9/1988 |
| EP | 0 325 013 B1 | 7/1989 |
| EP | 0 325 013 A1 | 7/1989 |
| EP | 0 361 420 A2 | 4/1990 |
| EP | 0 396 937 A2 | 11/1990 |

(List continued on next page.)

OTHER PUBLICATIONS

Gutcho, "Capsule Wall Treatment," *Microcapsules and Microencapsulation Techniques,* 1976, pp. 156–177.

Sankus, J., "Electrophoretic Display Cell," *Xerox Disclosure Journal,* May/Jun. 1979, vol. 4, No. 3, p. 309.

Gutcho, "Microencapsulation with Synthetic Polymeric Film Formers," *Microcapsules and Microencapsulation Techniques,* 1976, pp. 65–130.

(List continued on next page.)

*Primary Examiner*—Vijay Shankar
*Assistant Examiner*—Prabodh M. Dharia
(74) *Attorney, Agent, or Firm*—Testa, Hurwitz & Thibeault, LLP

(57) ABSTRACT

Methods and apparatus for an electrophoretic display in which the particle motion is a controlled, non-linear function of the applied electric field. Threshold addressing allows simple, inexpensive passive addressing techniques to be employed. The inverse electrorheological gating techniques allow the construction of a full color, passively addressed display without the need to address individual capsules. A mixture of capsules is coated randomly onto a substrate enabling the creation of inexpensive displays. All the techniques allow a significant threshold to be realized. Rapid movement of the pigment particles above the threshold allows rapid switching times for the display. Since diffusion and gravity are extremely weak forces compared to the yield stresses created, the structured or gelled medium approach provides a great improvement in the bistability of the displays.

16 Claims, 7 Drawing Sheets

U.S. PATENT DOCUMENTS

| | | |
|---|---|---|
| 3,670,323 A | 6/1972 | Sobel et al. |
| 3,756,693 A | 9/1973 | Ota |
| 3,767,392 A | 10/1973 | Ota |
| 3,772,013 A | 11/1973 | Wells |
| 3,792,308 A | 2/1974 | Ota |
| 3,806,893 A | 4/1974 | Ohnishi et al. |
| 3,850,627 A | 11/1974 | Wells et al. |
| 3,870,517 A | 3/1975 | Ota et al. |
| 3,892,568 A | 7/1975 | Ota |
| 3,909,116 A | 9/1975 | Kohashi |
| 3,922,255 A | 11/1975 | Koestler et al. |
| 4,001,140 A | 1/1977 | Foris et al. |
| 4,041,481 A | 8/1977 | Sato |
| 4,045,327 A | 8/1977 | Noma et al. |
| 4,062,009 A | 12/1977 | Raverdy et al. |
| 4,068,927 A | 1/1978 | White |
| 4,071,430 A | 1/1978 | Liebert |
| 4,087,376 A | 5/1978 | Foris et al. |
| 4,088,395 A | 5/1978 | Giglia |
| 4,093,534 A | 6/1978 | Carter et al. |
| 4,104,520 A | 8/1978 | Lewis et al. |
| 4,123,346 A | 10/1978 | Ploix |
| 4,126,528 A | 11/1978 | Chiang |
| 4,126,854 A | 11/1978 | Sheridon |
| 4,143,103 A | 3/1979 | Sheridon |
| 4,143,472 A | 3/1979 | Murata et al. |
| 4,147,932 A | 4/1979 | Lewis |
| 4,149,149 A | 4/1979 | Miki et al. |
| 4,166,800 A | 9/1979 | Fong |
| 4,196,437 A | 4/1980 | Hertz |
| 4,201,691 A | 5/1980 | Asher et al. |
| 4,203,106 A | 5/1980 | Dalisa et al. |
| 4,211,668 A | 7/1980 | Tate |
| 4,218,302 A | 8/1980 | Dalisa et al. |
| 4,231,641 A | 11/1980 | Randin |
| 4,261,653 A | 4/1981 | Goodrich |
| 4,272,596 A | 6/1981 | Harbour et al. |
| 4,273,672 A | 6/1981 | Vassiliades |
| 4,285,801 A | 8/1981 | Chiang |
| 4,287,337 A | 9/1981 | Guglielmetti et al. |
| 4,298,448 A | 11/1981 | Müller et al. |
| 4,305,807 A | 12/1981 | Somlyody |
| 4,311,361 A | 1/1982 | Somlyody |
| 4,314,013 A | 2/1982 | Chang |
| 4,324,456 A | 4/1982 | Dalissa |
| 4,368,952 A | 1/1983 | Murata et al. |
| 4,390,403 A | 6/1983 | Batchelder |
| 4,418,346 A | 11/1983 | Batchelder |
| 4,419,383 A | 12/1983 | Lee |
| 4,438,160 A | 3/1984 | Ishikawa et al. |
| 4,439,507 A | 3/1984 | Pan et al. |
| 4,444,961 A | 4/1984 | Timm |
| 4,450,440 A | 5/1984 | White |
| 4,502,934 A | 3/1985 | Gazard et al. |
| 4,522,472 A | 6/1985 | Liebert et al. |
| 4,543,306 A | 9/1985 | Dubois et al. |
| 4,605,284 A | 8/1986 | Fergason |
| 4,620,916 A | 11/1986 | Zwemer et al. |
| 4,623,706 A | 11/1986 | Timm et al. |
| 4,643,528 A | 2/1987 | Bell, Jr. |
| 4,648,956 A | 3/1987 | Marshall et al. |
| 4,655,897 A | 4/1987 | DiSanto et al. |
| 4,666,673 A | 5/1987 | Timm |
| 4,707,080 A | 11/1987 | Fergason |
| 4,732,830 A | 3/1988 | DiSanto et al. |
| 4,742,345 A | 5/1988 | DiSanto et al. |
| 4,746,917 A | 5/1988 | DiSanto et al. |
| 4,748,366 A | 5/1988 | Taylor |
| 4,833,464 A | 5/1989 | DiSanto et al. |
| 4,889,603 A | 12/1989 | DiSanto et al. |
| 4,891,245 A | 1/1990 | Micale |
| 4,909,959 A | 3/1990 | Lemaire et al. |
| 4,919,521 A | 4/1990 | Tada et al. |
| 4,931,019 A | 6/1990 | Park |
| 4,947,219 A | 8/1990 | Boehm |
| 5,009,490 A | 4/1991 | Kouno et al. |
| 5,017,225 A | 5/1991 | Nakanishi et al. |
| 5,041,824 A | 8/1991 | DiSanto et al. |
| 5,053,763 A | 10/1991 | DiSanto et al. |
| 5,057,363 A | 10/1991 | Nakanishi |
| 5,059,694 A | 10/1991 | Delabouglise et al. |
| 5,066,105 A | 11/1991 | Yoshimoto et al. |
| 5,066,559 A | 11/1991 | Elmasry et al. |
| 5,066,946 A | 11/1991 | DiSanto et al. |
| 5,070,326 A | 12/1991 | Yoshimoto et al. |
| 5,077,157 A | 12/1991 | DiSanto et al. |
| 5,082,351 A | 1/1992 | Fergason |
| 5,099,256 A | 3/1992 | Anderson |
| 5,105,185 A | 4/1992 | Nakanowatari et al. |
| 5,128,226 A | 7/1992 | Hung |
| 5,128,785 A | 7/1992 | Yoshimoto et al. |
| 5,132,049 A | 7/1992 | Garreau et al. |
| 5,138,472 A | 8/1992 | Jones et al. |
| 5,149,826 A | 9/1992 | Delabouglise et al. |
| 5,151,032 A | 9/1992 | Igawa |
| 5,174,882 A | 12/1992 | DiSanto et al. |
| 5,177,476 A | 1/1993 | DiSanto et al. |
| 5,185,226 A | 2/1993 | Grosso et al. |
| 5,187,609 A | 2/1993 | DiSanto et al. |
| 5,204,424 A | 4/1993 | Roncali et al. |
| 5,216,416 A | 6/1993 | DiSanto et al. |
| 5,216,530 A | 6/1993 | Pearlman et al. |
| 5,223,115 A | 6/1993 | DiSanto et al. |
| 5,223,823 A | 6/1993 | Disanto et al. |
| 5,233,459 A | 8/1993 | Bozler et al. |
| 5,247,290 A | 9/1993 | DiSanto et al. |
| 5,250,932 A | 10/1993 | Yoshimoto et al. |
| 5,250,938 A | 10/1993 | DiSanto et al. |
| 5,254,981 A | 10/1993 | DiSanto et al. |
| 5,262,098 A | 11/1993 | Crowley et al. |
| 5,266,098 A | 11/1993 | Chun et al. |
| 5,266,937 A | 11/1993 | DiSanto et al. |
| 5,268,448 A | 12/1993 | Buechner et al. |
| 5,270,843 A | 12/1993 | Wang |
| 5,272,238 A | 12/1993 | Garnier et al. |
| 5,276,113 A | 1/1994 | Hashiguchi et al. |
| 5,276,438 A | 1/1994 | DiSanto et al. |
| 5,279,511 A | 1/1994 | DiSanto et al. |
| 5,279,694 A | 1/1994 | DiSanto et al. |
| 5,293,528 A | 3/1994 | DiSanto et al. |
| 5,296,974 A | 3/1994 | Tada et al. |
| 5,298,833 A | 3/1994 | Hou |
| 5,302,235 A | 4/1994 | DiSanto et al. |
| 5,303,073 A | 4/1994 | Shirota et al. |
| 5,304,439 A | 4/1994 | Disanto et al. |
| 5,315,312 A | 5/1994 | DiSanto et al. |
| 5,326,484 A | 7/1994 | Nakashima et al. |
| 5,344,594 A | 9/1994 | Sheridon |
| 5,359,346 A | 10/1994 | DiSanto et al. |
| 5,360,689 A | 11/1994 | Hou et al. |
| 5,380,362 A | 1/1995 | Schubert |
| 5,383,008 A | 1/1995 | Sheridon |
| 5,389,945 A | 2/1995 | Sheridon |
| 5,402,145 A | 3/1995 | DiSanto et al. |
| 5,403,518 A | 4/1995 | Schubert |
| 5,411,398 A | 5/1995 | Nakanishi et al. |
| 5,411,656 A | 5/1995 | Schubert |
| 5,421,926 A | 6/1995 | Yukinobu et al. |
| 5,463,492 A | 10/1995 | Check |
| 5,467,107 A | 11/1995 | DiSanto et al. |
| 5,498,674 A | 3/1996 | Hou et al. |

| | | |
|---|---|---|
| 5,508,068 A | 4/1996 | Nakano |
| 5,512,162 A | 4/1996 | Sachs et al. |
| 5,528,399 A | 6/1996 | Izumi et al. |
| 5,543,177 A | 8/1996 | Morrison et al. |
| 5,543,219 A | 8/1996 | Elwakil |
| 5,552,679 A | 9/1996 | Murasko |
| 5,556,583 A | 9/1996 | Tashiro |
| 5,561,443 A | 10/1996 | DiSanto et al. |
| 5,565,885 A | 10/1996 | Tamanoi |
| 5,573,711 A | 11/1996 | Hou et al. |
| 5,582,700 A | 12/1996 | Bryning et al. |
| 5,583,675 A | 12/1996 | Yamada et al. |
| 5,597,889 A | 1/1997 | Takimoto et al. |
| 5,604,027 A | 2/1997 | Sheridon |
| 5,604,070 A | 2/1997 | Rao et al. |
| 5,610,455 A | 3/1997 | Allen et al. |
| 5,614,340 A | 3/1997 | Bugner et al. |
| 5,627,561 A | 5/1997 | Laspina et al. |
| 5,635,317 A | 6/1997 | Taniguchi et al. |
| 5,638,103 A | 6/1997 | Obata et al. |
| 5,639,914 A | 6/1997 | Tomiyama et al. |
| 5,643,506 A | 7/1997 | Rourke |
| 5,643,673 A | 7/1997 | Hou |
| 5,650,199 A | 7/1997 | Chang et al. |
| 5,650,247 A | 7/1997 | Taniguchi et al. |
| 5,650,872 A | 7/1997 | Saxe et al. |
| 5,654,367 A | 8/1997 | Takimoto et al. |
| 5,663,224 A | 9/1997 | Emmons et al. |
| 5,672,381 A | 9/1997 | Rajan |
| 5,673,148 A | 9/1997 | Morris et al. |
| 5,676,884 A | 10/1997 | Tiers et al. |
| 5,688,584 A | 11/1997 | Casson et al. |
| 5,691,098 A | 11/1997 | Busman et al. |
| 5,693,442 A | 12/1997 | Weiss et al. |
| 5,694,224 A | 12/1997 | Tai |
| 5,707,738 A | 1/1998 | Hou |
| 5,707,747 A | 1/1998 | Tomiyama et al. |
| 5,708,525 A | 1/1998 | Sheridon |
| 5,709,976 A | 1/1998 | Malhotra |
| 5,714,270 A | 2/1998 | Malhotra et al. |
| 5,715,511 A | 2/1998 | Aslam et al. |
| 5,716,550 A | 2/1998 | Gardner et al. |
| 5,717,283 A | 2/1998 | Biegelsen et al. |
| 5,717,514 A | 2/1998 | Sheridon |
| 5,717,515 A | 2/1998 | Sheridon |
| 5,725,935 A | 3/1998 | Rajan |
| 5,729,632 A | 3/1998 | Tai |
| 5,737,115 A | 4/1998 | Mackinlay et al. |
| 5,739,801 A | 4/1998 | Sheridon |
| 5,745,094 A | 4/1998 | Gordon, II et al. |
| 5,751,268 A | 5/1998 | Sheridon |
| 5,753,763 A | 5/1998 | Rao et al. |
| 5,754,332 A | 5/1998 | Crowley |
| 5,759,671 A | 6/1998 | Tanaka et al. |
| 5,760,761 A | 6/1998 | Sheridon |
| 5,767,826 A | 6/1998 | Sheridon et al. |
| 5,777,782 A | 7/1998 | Sheridon |
| 5,783,614 A | 7/1998 | Chen et al. |
| 5,808,783 A | 9/1998 | Crowley |
| 5,825,529 A | 10/1998 | Crowley |
| 5,828,432 A | 10/1998 | Shashidhar et al. |
| 5,843,259 A | 12/1998 | Narang et al. |
| 5,900,858 A | 5/1999 | Richley |
| 5,914,806 A | 6/1999 | Gordon, II et al. |
| 5,930,026 A | 7/1999 | Jacobson et al. |
| 5,961,804 A * | 10/1999 | Jacobson et al. ........... 204/606 |
| 6,014,247 A | 1/2000 | Winter et al. |
| 6,064,784 A | 5/2000 | Whitehead et al. |
| 6,113,810 A | 9/2000 | Hou et al. |
| 6,117,294 A | 9/2000 | Rasmussen |
| 6,117,368 A | 9/2000 | Hou |
| 6,262,833 B1 * | 7/2001 | Loxley et al. ............... 359/296 |
| 6,407,763 B1 * | 6/2002 | Yamaguchi et al. ......... 347/112 |
| 6,473,072 B1 * | 10/2002 | Comiskey et al. .......... 345/173 |
| 6,506,438 B2 * | 1/2003 | Duthaler et al. ............... 427/58 |
| 6,515,649 B1 * | 2/2003 | Albert et al. ................ 345/107 |

FOREIGN PATENT DOCUMENTS

| | | |
|---|---|---|
| EP | 0 404 545 A2 | 12/1990 |
| EP | 0 442 123 A1 | 8/1991 |
| EP | 0 443 571 A2 | 8/1991 |
| EP | 0 525 852 B1 | 2/1993 |
| EP | 0 525 852 A1 | 2/1993 |
| EP | 0 540 281 A2 | 5/1993 |
| EP | 0 708 798 B1 | 5/1996 |
| EP | 0 709 713 A2 | 5/1996 |
| EP | 0 721 176 A3 | 7/1996 |
| EP | 0 721 176 A2 | 7/1996 |
| EP | 0 962 808 A2 | 12/1999 |
| EP | 1 024 540 A2 | 8/2000 |
| GB | 1 314 906 | 4/1973 |
| GB | 1 465 701 | 3/1977 |
| GB | 2 044 508 A | 10/1980 |
| GB | 2 292 119 A | 2/1996 |
| GB | 2 306 229 A | 4/1997 |
| GB | 2 324 273 A | 10/1998 |
| JP | 53-73098 | 6/1978 |
| JP | 54111368 | 8/1979 |
| JP | 55096922 | 7/1980 |
| JP | 60189731 | 9/1985 |
| JP | 60197565 | 10/1985 |
| JP | 62058222 | 3/1987 |
| JP | 62231930 | 10/1987 |
| JP | 62269124 | 11/1987 |
| JP | 62299824 | 12/1987 |
| JP | 01086117 A | 3/1989 |
| JP | 01086118 A | 3/1989 |
| JP | 64 86116 | 3/1989 |
| JP | 01142537 A | 6/1989 |
| JP | 01177517 | 7/1989 |
| JP | 01248182 A | 10/1989 |
| JP | 01267525 | 10/1989 |
| JP | 02223934 A | 9/1990 |
| JP | 02223935 A | 9/1990 |
| JP | 02223936 A | 9/1990 |
| JP | 02284124 A | 11/1990 |
| JP | 02284125 A | 11/1990 |
| JP | 3-053224 | 3/1991 |
| JP | 3-091722 | 4/1991 |
| JP | 3-096925 | 4/1991 |
| JP | 04307512 A | 10/1992 |
| JP | 4-307523 | 10/1992 |
| JP | 04345133 A | 12/1992 |
| JP | 5-61421 | 3/1993 |
| JP | 05165064 A | 6/1993 |
| JP | 05173194 A | 7/1993 |
| JP | 05307197 A | 11/1993 |
| JP | 6089081 | 3/1994 |
| JP | 6-202168 | 7/1994 |
| JP | 2551783 | 8/1996 |
| JP | 08234176 | 9/1996 |
| JP | 9-6277 | 1/1997 |
| JP | 950181574 | 2/1997 |
| JP | 9-185087 | 7/1997 |
| JP | 9-211499 | 8/1997 |
| JP | 09230391 | 9/1997 |
| JP | 10-48673 | 2/1998 |
| JP | 10-149118 A | 6/1998 |
| JP | 10-161161 | 6/1998 |
| JP | 11212499 A | 8/1999 |
| JP | 11219135 A | 8/1999 |
| JP | 11237851 A | 8/1999 |

| | | |
|---|---|---|
| JP | 11352526 | 12/1999 |
| WO | WO 82/02961 | 9/1982 |
| WO | WO 92/17873 | 10/1992 |
| WO | WO 94/24236 | 10/1994 |
| WO | WO 95/02636 | 1/1995 |
| WO | WO 95/05622 | 2/1995 |
| WO | WO 95/15363 | 6/1995 |
| WO | WO 95/19227 | 7/1995 |
| WO | WO 95/27924 | 10/1995 |
| WO | WO 95/33085 | 12/1995 |
| WO | WO 97/04398 | 2/1997 |
| WO | WO 97/24715 | 7/1997 |
| WO | WO 97/24907 | 7/1997 |
| WO | WO 98/03896 | 1/1998 |
| WO | WO 98/19208 | 5/1998 |
| WO | WO 98/41898 | 9/1998 |
| WO | WO 98/41899 | 9/1998 |
| WO | WO 98/58383 | 12/1998 |
| WO | WO 99/10767 | 3/1999 |
| WO | WO 99/10768 | 3/1999 |
| WO | WO 99/12170 | 3/1999 |
| WO | WO 99/26419 | 5/1999 |
| WO | WO 99/47970 | 9/1999 |
| WO | WO 99/56171 | 11/1999 |
| WO | WO 99/65011 | 12/1999 |
| WO | WO 99/65012 | 12/1999 |
| WO | WO 00/10048 | 2/2000 |

OTHER PUBLICATIONS

Gutcho, "Pigments and Paints," *Microcapsules and Microencapsulation Techniques*, 1976, pp. 178–193.

Ballinger et al., "Magnetic Recording Paper is Erasable," *Electronics*, Mar. 1, 1973, pp. 73–76.

Beilin et al., "2000–Character Electrophoretic Display," *SID 86 Digest*, 1986, pp. 136–140.

Blazo, S.F., "10.1/9:00 A.M.: High Resolution Electrophoretic Display with Photoconductor Addressing," *SID 82 Digest*, 1982, pp. 92–93.

Bohnke et al., "Polymer–Based Solid Electrochromic Cell for Matrix–Addressable Display Devices," *J. Electrochem Soc.*, 1991, vol. 138, No. 12, pp. 3612–3617.

Bryce, "Seeing Through Synthetic Metals," *Nature*, 1988, vol. 335, No. 1, pp. 12–13.

Chiang, "Conduction Mechanism of Charge Control Agents Used in Electrophretic Display Devices," *Proceedings of the S.I.D.*, 1977, vol. 18, Nos. 3 & 4, pp. 275–282.

Chiang et al., "A High Speed Electrophoretic Matrix Display," *SID 80 Digest*, 1980, pp. 114–115.

Comiskey et al., "Electrophoretic Ink: A Printable Display Material," *SID 99 Digest*, 1997, pp. 75–76.

Croucher et al., "Electrophoretic Display: Materials as Related to Performance," *Photographic Science and Engineering*, 1981, vol. 25, No. 2, pp. 80–86.

Dalisa, "Electrophoretic Display Technology," *Transactions on Electron Devices*, 1977, vol. 24, No. 7, pp. 827–34.

Egashira et al., "A Solid Electrochromic Cell Consisting of LU–Diphthalocyanine and Lead Fluroide," *Proceedings of the SID*, 1987, vol. 28, No. 3, pp. 227–232.

Fitzhenry, "Optical Effects of Adsorption of Dyes on Pigment Used in Electrophoretic Image Displays," *Applied Optics*, 1979, vol. 18, No. 19, pp. 3332–3337.

Fitzhenry, "Optical Properties of Electrophoretic Image Displays," *Proceedings of the SID*, 1981, vol. 22, No. 4, pp. 300–309.

Goodman, "Pasive Liquid Displays: Liquid Crystals, Electrophoretics, and Electrochromics," *Procedding of the SID*, 1976, vol. 17, No. 1, pp. 30–38.

Gutcho, "Additional Uses for Encapsulated Products," *Microencapsules and Microencapsulation Techniques*, 1976, pp. 27–43.

Hatano et al., "Bistable Paper–White Display Device Using Cholesteric Liquid Crystals," *SID 96 Digest*, 1996, pp. 269–272.

Ji et al., "P–50: Polymer Walls in Higher–Polymer–Content Bistable Reflective Cholesteric Displays," *SID 96 Digest*, ; 1996, pp. 611–613.

Jin et al., "Optically Transparent, Electrically Conductive Composite Medium," *Science*, 1992, pp. 446–448.

Lee, L., "Fabrication of Magnetic Particles Display," *Proceeding of the SID*, 1977, vol. 18, Nos. 3 & 4, pp. 283–288.

Lewis et al., "Gravitational, Inter–Particle and Particle–Electrode Forces in the Electorphoretic Display," *Proceedings of the SID*, 1977, vol. 18, Nos. 3 & 4, pp. 235–242.

Mürau et al., "The Understanding and Elimination of Some Suspension Instabilities in an Electrophoretic Display," *J. Appl. Phys.*, 1987, vol. 49, No. 9, pp. 4820–4829.

Mürau et al., "An Electrophoretic Radiographic Device," *SID 79 Digest*, 1979, pp. 46–47.

Vaz et al., "Dual Frequency Addressing of Polymer–Dispensed Liquid–Crystal Films," *Journal of Applied Physics*, Jun. 1989, vol. 65, No. 12, pp. 5043–5049.

Ota et al., "Developments in Electrophoretic Displays," *Proceedings of the SID*, 1977, vol. 18, Nos. 3 & 4, pp. 243–254.

Ota et al., "Electrophoretic Display Devices," *Laser 75 Optoelectronics Conference Proceedings*, pp. 145–148.

Ota et al., "Electorphoretic Image Display (EPID) Panel," *Proceedings of the IEEE*, 1973, pp. 1–5.

Pankove, J., "Color Reflection Type Display Panel," *RCA Technical Notes*, 1962, No. 535: 2.

Pearlstein, F., "Electroless Plating," *Modern Electroplating*, pp. 710–747.

Saitoh, M. et al., "A Newly Developed Electrical Twisting Ball Display," *Proceedings of the SID*, 1982 vol. 23, No. 4, pp. 249–253.

Sheridon et al., "The Gyricon—A Twisting Ball Display," *Proceedings of the SID*, 1977, vol. 18, Nos. 3 & 4, pp. 289–293.

Shiffman, R.R. et al., "An Electrophoretic Image Display with Internal NMOS Address Logic and Display Drivers," *Proceedings of the SID*, 1984, vol. 25, No. 2, pp. 105–115.

Shiwa, S. et al., "5.6 Electrophoretic Display Method Using Ionographic Technology," *SID 88 Digest*, 1988, pp. 61–62.

Singer, B. et al., "An X–Y Addressable Electrophoretic Display," *Proceeding of the SID*, 1977, vol. 18, Nos. 3 & 4, pp. 255–266.

"Electronic Book is a Whole Library," *The Sunday Times, Book Review*, Feb. 25, 1996.

Vance, "Optical Characteristics of Electrophoretic Displays," *Proceeding of the SID*, 1977, vol. 18, Nos. 3 & 4, pp. 267–274.

Yamaguchi, M. et al., "Equivalent Circuit of Ion Projection–Driven Electrophoretic Display," *IEICE Transactions*, 1991, vol. 74, No. 12, pp. 4152–4156.

Yang et al., "A New Architecture of Polymer Transistors," *Nature*, 1994, vol. 372, pp. 344–346.

Zollinger, "Structure of Simple Di–and Triarylmethine Dyes and Their Aza Analogues," *Color Chemistry, Synthesis, Properties and Applications of Organic Dyes and Pigments*, 2nd, Rev. Edition, VCH, Weinheim, 1991, pp. 73.

"Electronic Ink' Sign Debuts at JCPenney," *Boston Globe,* May 4, 1999, p.C9.

Flaherty, J., "What Did Disappearing Ink Grow Up to Be? Electronic Ink," *The New York Times,* May 6, 1999.

Negroponte & Jacobson, "Surfaces and Displays," *Wired,* Jan. 1997, p. 212.

Comiskey, B. et al., "An Electrophoretic Ink for All–Printed Reflective Electronic Displays," *Nature,* Jul. 16, 1998, vol. 394, pp. 253–255.

Zurer, P., "Digital Ink Brings Electronic Books Closer," *Chemical,* Jul. 20, 1998, pp. 12–13.

Peterson, I., "Rethinking Ink. Printing the Pages of an Electronic Book," *Science News,* Jun. 20, 1998, vol., 153, pp. 396–397.

Guernsey L., "Beyond Neon: Electronic Ink," *New York Times,* B11, Col. 3, Jun. 3, 1999, p. 11.

White, R., "An Electrophoretic Bar Graph Display," *Proceedings of the SID,* 1981, vol. 22 No. 3, pp. 173–180.

Pansu et al., "Structures of Thin Layers of Hard Spheres: High Pressure Limit," *J. Physique,* Feb. 1984, vol. 45, pp. 331–339.

Peiranski et al. (1983), "Thin Colloidal Crystals," *Physical Review Letters,* Mar. 21, 1983, vol. 50, No. 12, pp. 900–903.

Pansu et al., "Thin Colloidal Crystals: A Series of Structural Transitions," *J. Physique,* Apr. 1983, vol. 44, pp. 531–536.

Van Winkle et al., "Layering Transitions in Colloidal Crystals as Observed by Diffraction and Direct–Lattice Imaging", *Physical Review,* Jul. 1986, vol. 34, No. 1, pp. 562–573.

Chiang, "A Stylus Writable Electrophoretic Display Device," *SID 79 Digest,* pp. 44–45.

Nakamura et al., "Development of Electrophoretic Display Using Microencapsulated Suspension," *1998 SID International Symposium Digest of Technical Papers—vol. 29, Proceedings of SID '98 International Symposium, Anaheim, CA, USA,* May 1998, pp. 1014–1017.

Ridley et al., "All–Inorganic Field Effect Transistors Fabricated by Printing," *Science,* Oct. 22, 1999, vol. 286, pp. 746–748.

Dabbousi et al., "Electroluminescece from CdSe Quantum–Dot/Polymer Composites," *Appl. Phys. Lett.,* Mar. 1995, vol. 66, No. 11, pp. 1316–1318.

Huang et al., "Photoluminescence and Electroluminescence of ZnS:Cu Nanocrystals in Polymeric Networks," *Appl. Phys. Lett.,* May 5, 1997, vol. 70, No. 18, pp. 2335–2337.

Vandegaer, Jan E., "Microencapsulation: Processes and Applications ed., " *American Chemical Society Symposium,* Chigaco, IL, 1973, pp. v–x, 1–180 (published by Plenum Press, New York, 1974).

Drzaic et al., "A Printed and Rollable Bistable Electronic Display," *1998 SID International Symposium, Digest of Technical Papers,* 1998, vol. 29, pp. 1131–1134.

Shimoda et al., "Multicolor Pixel Patterning of Light–Emitting Polymers by Ink–Jet Printing," *SID 99 Digest,* May 1999, pp. 377–379.

Nakabu, S. et al., "The Development of Super–High Aperture Ratio With Low–Electrically Resistive Material for High–Resolution TFT–LCD's," *SID 99 Digest,* pp. 732–735.

Luckham, P.F. et al., "The Controlled Flocculation of Particulate Dispersion Using Small Particles of Opposite Charge. II. Investigation of Floc Structure Using a Freeze–Fracture Technique," *Colloids and Surfaces,* 1983, vol. 6, pp. 83–95.

Luckham, P.F. et al., "The Controlled Floccualtion of Particulate Dispersion Using Small Particles of Opposite Charge. III. Investigation of Floc Structure Using a Freeze–Fracture Technique," *Colloids and Surfaces,* 1983, vol. 6, pp. 101–118.

Vincent, B. et al., "Absorption of Small, Positive Particles onto Large, Negative Particles in the Presence of Polymer," *J.C.S. Faraday 1,* 1980, vol. 76, pp. 665–673.

Lee, L., "A Magnetic–Particles Display," *Proc. Soc. Inf. Disp. (USA),* 1975, vol. 16, No. 3, pp. 177–184.

* cited by examiner

THRESHOLD ADDRESSING OF ELECTROPHORETIC DISPLAYS

CROSS-REFERENCE TO RELATED APPLICATION

The present application claims priority to and the benefit of U.S. provisional patent application Ser. No. 60/132,303, filed May 3, 1999, the entire disclosure of which is incorporated herein by reference.

TECHNICAL FIELD

The invention provides methods of threshold addressing of electrophoretic displays. More particularly, the invention relates to materials and methods for providing a particle-filled capsule in which the capsules are addressed with two voltages or, alternatively, at a threshold.

BACKGROUND OF THE INVENTION

In an electrophoretic display (encapsulated or not), the particles contained within the display move by being driven according to an applied electric field. This movement produces a display state with the particles in one location and a display state with particles in a second location. However, in a conventional electrophoretic display, each pixel must be addressed individually to cause the display to operate. The provision of address lines that address individual pixels at predetermined locations in a display can be quite complex and expensive. In color displays, the necessity to address number of color elements per pixel increases the complexity and expense of manufacture of such displays.

The bistable nature of electrophoretic displays is another beneficial feature of these displays as compared to many other types of displays. Electrophoretic displays can retain their state for some period of time without the active application of power or of a driving signal, as compared to many other types of active displays such as cathode ray tubes, LEDs, LCDs and the like, which lose their display as soon as either (or both) of power or a driving signal is removed. Thermal or gravitational forces ultimately can degrade the display state of an electrophoretic display by inducing undesired motion in the particles that comprise such a display. Electrophoretic displays in general can benefit from an increased duration of a stable display state.

SUMMARY

The present invention relates to methods and materials for an electrophoretic display such that the particle motion is a controlled, non-linear function of the applied electric field. More particularly, the techniques and materials of the invention prevent, or at least significantly impede, the motion of charged pigment particles in the display under one set of conditions, while allowing them to move relatively freely under a second set of conditions. The invention enables, for example, passive addressing of the display and can eliminate gravitational or diffusional motion of the pigment particles over time, thus enhancing the bistable nature of the display.

Thus, threshold addressing allows simple, inexpensive passive addressing techniques to be employed. The inverse electrorheological gating techniques allow the construction of a full color, passively addressed display without the need to address individual capsules. This allows a mixture of capsules to be coated randomly onto a substrate, again enabling the creation of inexpensive displays. All the techniques described allow a significant threshold to be realized, which allows rapid movement of the pigment particles above the threshold, which in turn allows rapid switching times for the display. The use of grafted molecules to provide steric stability to the pigment and floc network particles combined with controlled strength ion pairs instead of physically adsorbed dispersants and charging agents, allows improved control over the conductivity of the display medium in both encapsulated and traditional electrophoretic displays. Since diffusion and gravity are extremely weak forces compared to the yield stresses created, the structured or gelled medium approach also provides a great improvement in the bistability of the displays.

BRIEF DESCRIPTION OF THE DRAWINGS

The invention, in accordance with preferred and exemplary embodiments, together with further advantages thereof, is more particularly described in the following detailed description, taken in conjunction with the accompanying drawings.

In the drawings, like reference characters generally refer to the same parts throughout the different views. Also, the drawings are not necessarily to scale, emphasis instead generally being placed upon illustrating principles of the invention.

DESCRIPTION

Figure 1:
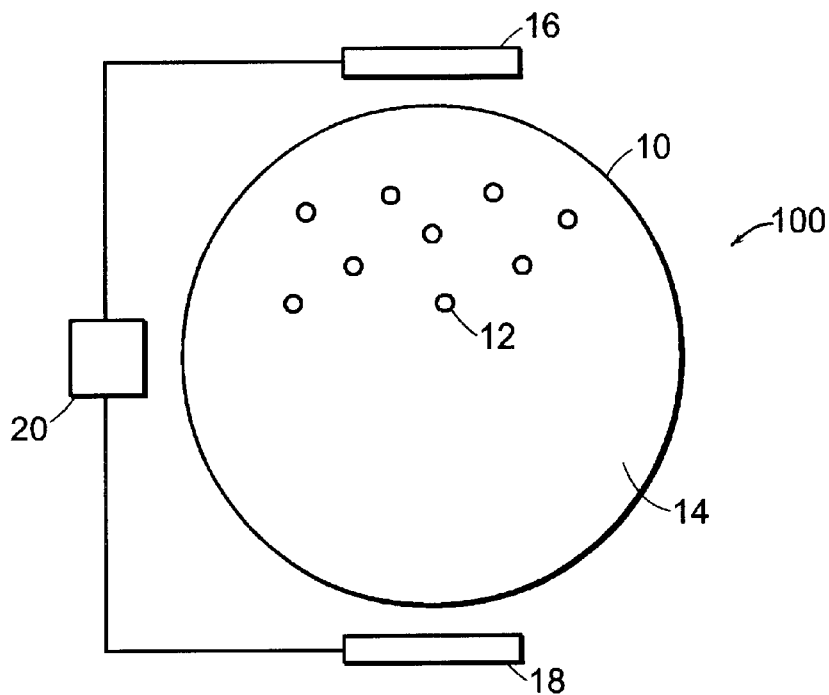
FIG. 1 shows a schematic depiction of a capsule containing particles that do not move under an applied voltage below a threshold value, according to the invention.

The present invention relates to methods and materials for an electrophoretic display such that the particle motion occurs at a relatively high velocity upon application of an electric field. More particularly, the techniques and materials of the invention substantially prevent the motion of charged pigment particles in a display under one set of conditions while allowing them to move at a relatively high velocity under a second set of conditions. The invention contributes to allow passive addressing of a display. The invention also can eliminate gravitational or diffusional motion of the pigment particles over time to enhance the bistable nature of certain displays. Throughout the Specification, the present invention will be described for encapsulated electrophoretic displays, but the methods and materials of the invention are applicable to unencapsulated electrophoretic displays.

In some displays, the particles have a slight tendency to stick on the walls of a display cell. If the potential of the electric field is too low, the particles will not leave the wall, and if the potential of the electric field is high enough, the particles will leave the wall and move in the cell. However, this technique apparently requires a long switching time, suggesting that the threshold voltage was too small to make the technique practical.

Thus, other approaches are needed to enable practical passive addressing. One approach is to use mechanisms that allow the particles to move only when the driving voltage exceeds some significant threshold value. This mechanism allows passive addressing and can be termed "voltage threshold addressing." Another approach employs an inverse electrorheological gate to control the display. This mechanism allows the rheological properties of the display medium to be altered along a "select" line such that an applied "data" line voltage can move the particles in this altered state but the same voltage is insufficient to move the particles in the unaltered state. Several examples for each approach are described below. Additionally, the creation of polymers and colloidal particles that can be used to achieve these approaches are described below.

I. Electrophoretic Displays

Electrophoretic displays have been the subject of intense research and development for a number of years. Electrophoretic displays have attributes of good brightness and contrast, wide viewing angles, state bistability, and low power consumption when compared with liquid crystal displays. Nevertheless, problems with the long-term image quality of these displays have prevented their widespread usage. For example, particles that make up such displays tend to cluster and settle, resulting in inadequate service-life for these displays.

An encapsulated electrophoretic display typically does not suffer from the clustering and settling failure mode of traditional electrophoretic devices and provides further advantages, such as the ability to print or coat the display on a wide variety of flexible and rigid substrates. Use of the word "printing" is intended to include all forms of printing and coating, including, but without limitation: premetered coatings such as patch die coating, slot or extrusion coating, slide or cascade coating, and curtain coating; roll coating such as knife over roll coating, forward and reverse roll coating; gravure coating; dip coating; spray coating; meniscus coating; spin coating; brush coating; air knife coating; silk screen printing processes; electrostatic printing processes; thermal printing processes; and other similar techniques. Thus, the resulting display can be flexible. Further, because the display media can be printed (using a variety of methods), the display itself can be made inexpensively.

In broad overview, the invention relates to encapsulated electrophoretic displays that provide a flexible, reflective display that can be manufactured easily and consume little power (or no power in the case of bistable displays in certain states), as well as materials and methods useful in their construction. Such displays, therefore, can be incorporated into a variety of applications. The display can be formed from and can include particles that move in response to an electric charge. This mode of operation is typical in the field of electrophoretic displays. A display in which the particles, ordered by an electric charge, take on a certain configuration can take on many forms. Once the electric field is removed, the particles can be generally stable (e.g., bistable). Additionally, providing a subsequent electric charge can alter a prior configuration of particles. Some encapsulated electrophoretic displays may include two or more different types of particles. Such displays may include, for example, displays containing a plurality of anisotropic particles and a plurality of second particles in a suspending fluid. Application of a first electric field may cause the anisotropic particles to assume a specific orientation and present an optical property. Application of a second electric field may then cause the plurality of second particles to translate, thereby disorienting the anisotropic particles and disturbing the optical property. Alternatively, the orientation of the anisotropic particles may allow easier translation of the plurality of second particles. The particles may have a refractive index that substantially matches the refractive index of the suspending fluid.

An encapsulated electrophoretic display can be constructed so that the optical state of the display is stable for some length of time. When the display has two states that are stable in this manner, the display is bistable. If more than two states of the display are stable, then the display is multistable. For the purpose of the present invention, the term bistable indicates a display in which any optical state remains fixed once the addressing voltage is removed. However, the definition of a bistable state depends upon the display's application. A slowly decaying optical state can be effectively bistable if the optical state is substantially unchanged over the required viewing time. For example, in a display that is updated every few minutes, a display image that is stable for hours or days is effectively bistable for a particular application. Thus, for purposes of the present invention, the term bistable also indicates a display with an optical state sufficiently long-lived so as to be effectively bistable for a particular application. Alternatively, it is possible to construct encapsulated electrophoretic displays in which the image decays quickly once the addressing voltage to the display is removed (i.e., the display is not bistable or multistable). Whether or not an encapsulated electrophoretic display is bistable, and its degree of bistability, can be controlled through appropriate chemical modification of the electrophoretic particles, the suspending fluid, the capsule, and binder materials.

An encapsulated electrophoretic display may take many forms. The display may include capsules dispersed in a binder. The capsules may be of any size or shape. The capsules may, for example, be spherical and may have diameters in the millimeter range or the micron range, but are preferably from about ten to about a few hundred microns. The capsules may be formed by an encapsulation technique. Particles may be encapsulated in the capsules. The particles may be two or more different types of particles. The particles may be colored, luminescent, light-absorbing or transparent, for example. The particles may include neat pigments, dyed (laked) pigments or pigment/polymer composites, for example. The display may further include a suspending fluid in which the particles are dispersed.

Generally, an encapsulated electrophoretic display includes a capsule with one or more species of particle that either absorb or scatter light and that are suspended in a fluid. One example is a system in which the capsules contain one or more species of electrophoretically mobile particles dispersed in a dyed suspending fluid. Another example is a system in which the capsules contain two separate species of particles suspended in a clear suspending fluid, in which one species of particle absorbs light (black), while the other species of particle scatters light (white). There are other extensions (more than two species of particles, with or without a dye, etc.). The particles are commonly solid pigments, dyed particles, or pigment/polymer composites.

In electrophoretic displays, the particles may be oriented or translated by placing an electric field across the capsule. The electric field may include an alternating-current field or a direct-current field. The electric field may be provided by at least one pair of electrodes disposed adjacent to a display comprising the capsule.

The successful construction of an encapsulated electrophoretic display requires the proper interaction of all these materials and processes. Materials such as a polymeric binder (for example, for binding the capsules to a substrate), electrophoretic particles, fluid (for example, to surround the electrophoretic particles and provide a medium for migration), and a capsule membrane (for example, for enclosing the electrophoretic particles and fluid) must all be chemically compatible. The capsule membranes may engage in useful surface interactions with the electrophoretic particles, or may act as an inert physical boundary between the fluid and the binder. Polymer binders may set as adhesives between capsule membranes and electrode surfaces.

Various materials may be used to create electrophoretic displays. Selection of these materials is based on the functional constituents of the display to be manufactured. Such functional constituents include, but are not limited to, particles, dyes, suspending fluids, stabilizing/charging additives, and binders. In one embodiment, types of particles that may be used to fabricate suspended particle displays include scattering pigments, absorbing pigments and luminescent particles. Such particles may also be transparent. Exemplary particles include titania, which may be coated in one or two layers with a metal oxide, such as aluminum oxide or silicon oxide, for example. Such particles may be constructed as corner cubes. Luminescent particles may include, for example, zinc sulfide particles. The zinc sulfide particles may also be encapsulated with an insulative coating to reduce electrical conduction. Light-blocking or absorbing particles may include, for example, dyes or pigments. Types of dyes for use in electrophoretic displays are commonly known in the art. Useful dyes are typically soluble in the suspending fluid, and may further be part of a polymeric chain. Dyes may be polymerized by thermal, photochemical, and chemical diffusion processes. Single dyes or mixtures of dyes may also be used.

A suspending (i.e., electrophoretic) fluid may be a high resistivity fluid. The suspending fluid may be a single fluid, or it may be a mixture of two or more fluids. The suspending fluid, whether a single fluid or a mixture of fluids, may have its density substantially matched to that of the particles within the capsule. The suspending fluid may be halogenated hydrocarbon, such as tetrachloroethylene, for example. The halogenated hydrocarbon may also be a low molecular weight polymer. One such low molecular weight polymer is poly(chlorotrifluoroethylene). The degree of polymerization for this polymer may be from about 2 to about 10.

Furthermore, capsules may be formed in, or later dispersed in, a binder. Materials for use as binders include water-soluble polymers, water-dispersed polymers, oil-soluble polymers, thermoset polymers, thermoplastic polymers, and uv- or radiation-cured polymers.

While the examples described here are listed using encapsulated electrophoretic displays, there are other particle-based display media that also should work well, including encapsulated suspended particles and rotating ball displays. Other display media, such as liquid crystals and magnetic particles, also can be useful.

In some cases, a separate encapsulation step of the process is not necessary. The electrophoretic fluid may be directly dispersed or emulsified into the binder (or a precursor to the binder material) to form what may be called a "polymer-dispersed electrophoretic display." In such displays, the individual electrophoretic phases may be referred to as capsules or microcapsules even though no capsule membrane is present. Such polymer-dispersed electrophoretic displays are considered to be subsets of encapsulated electrophoretic displays.

In an encapsulated electrophoretic display, the binder material surrounds the capsules and separates the two bounding electrodes. This binder material must be compatible with the capsule and bounding electrodes and must possess properties that allow for facile printing or coating. It may also possess barrier properties for water, oxygen, ultraviolet light, the electrophoretic fluid, or other materials. Further, it may contain surfactants and cross-linking agents, which could aid in coating or durability. The polymer-dispersed electrophoretic display may be of the emulsion or phase separation type.

II. Brief Introduction to the Theory of Electrophoretic Motion of Charged Particles The electrophoretic motion of charged particles in a fluid is covered in most textbooks on colloid science. See, for example, Hiemenz, P. C. and Rajagopalan, R., *Principles of Colloid and Surface Chemistry*, $3^{rd}$ ed., Marcel Dekker, NY, 1997. In systems of interest for electrophoretic displays, the dielectric constant is usually low ($\epsilon_r \approx 2$), and the number of ions small. In this regime the following equation is true $$\zeta = \frac{q}{2\pi\epsilon_r\epsilon_0 d_p} \quad (1)$$

where $\zeta$=zeta potential q=net charge on the particle $\epsilon_r$=dielectric constant $\epsilon_0$=permittivity constant=8.85% $10^{-12}$ C$^2$/Nm$^2$, and $d_p$=particle diameter In an applied electric field, $\vec{E}$, the particle will experience a force $$F_{el} = q\vec{E} \quad (2)$$

Solving Equation 1 for q and substituting in Equation 2, yields the following equation $$F_{el} = 2\pi\epsilon_r\epsilon_0 d_p \zeta \vec{E} \quad (3)$$

The shear stress exerted by a particle on the surrounding medium may be approximated as the force exerted on the particle (by, for example, gravity or in this case the electric field) divided by the surface area, A, of the particle. Although this is not strictly correct, it gives a numerical value well within the range of values calculated by more rigorous derivations. Thus, the shear stress exerted on the medium by a charged particle in an electric field can be taken as $$\tau_{el} = \frac{F_{el}}{A} = \frac{2\pi\epsilon_r\epsilon_0 d_p \zeta \vec{E}}{\pi d_p^2} = \frac{2\epsilon_r\epsilon_0 \zeta \vec{E}}{d_p} \quad (4)$$

The electrophoretic velocity of a charged particle in a medium is found by balancing the electrostatic force on the particle, $F_{el}$, with that due to viscous drag, which is given by $$F_{vis} = 3\pi\eta d_p v \quad (5)$$

where $\eta$ is the apparent viscosity of the medium and v is the particle velocity. Thus, the electrophoretic velocity is given by $$v = \frac{q\vec{E}}{3\pi\eta d_p} \quad (6)$$

Or, combining this with equation 1, $$v = \frac{2\epsilon_r\epsilon_0 \zeta \vec{E}}{3\eta} \quad (7)$$

In the usual case the viscosity, $\eta$, and the $\zeta$ potential are constant. Cases are presented in which either a constant $\zeta$ or a field dependent $\zeta$ are combined with a viscosity, $\eta$, that is (a) constant, (b) a function of the shear stress (using the Herschel Bulkley model), or (c) a function of both the shear stress and the applied electric field.

The Herschel Bulkley equation models a material that has a yield stress and flows like a power law fluid above this stress. The equation is:

$$\tau = \tau_H + (\eta_H D)^p \quad (8)$$

where $\tau$=shear stress $\tau_H$=yield stress $\eta_H$=Herschel Bulkley viscosity D=shear rate, and p=Herschel Bulkley index The apparent viscosity needed to calculate the electrophoretic velocity is then obtained by rearranging Equation 8 to obtain $$\eta = \frac{\tau_{el}}{D} = \frac{\tau_{el}\eta_H}{(\tau_{el} - \tau_H)^{y_p}} \quad (9)$$

Equation 9 is valid for $\tau_{el} > \tau_H$. For $\tau_{el} \leq \tau_H$, the model considers the apparent viscosity to be infinite. That is, the material behaves like a solid below the yield stress. For a fluid that is a function of both the shear stress and the applied electric field, this model is modified to incorporate a field dependent yield stress:

$$\eta = \frac{\tau_{el}}{D} = \frac{\tau_{el}\eta_H}{\left(\tau_{el} - \frac{\tau_H}{k\vec{E}}\right)^{y_p}} \quad (10)$$

where k is a constant, and the equation is valid for values of $\tau_{el} > \tau_H / k\vec{E}$. Below this value, the material behaves as a solid, and the apparent viscosity is infinite.

In the present analysis, the nominal $\zeta$ potential is defined as $\zeta_0$, and is set to be 100 mV. For cases in which the $\zeta$ potential is constant, the relation $\zeta = \zeta_0$ is used. For the cases in which the $\zeta$ potential is field dependent, the following relation is used:

$$\zeta = 2\zeta_0 e^{0.32} \quad (11)$$

The Herschel Bulkley model is an approximation of the actual physics that occurs in a real system, as is every theoretical model. However, it is sufficiently accurate to demonstrate the effects of rheology on the system. The values listed below are appropriate for the exemplary embodiments that are presented hereafter:

Herschel Bulkley viscosity, $\eta_H$=0.003 Pascal seconds

Herschel Bulkley yield stress, $\tau_H$=4 Pascals

Herschel Bulkley index, p=0.8

Field dependent HB constant, k=3

For the cases in which the viscosity is constant, the relation $\eta = 2\eta_H/3$ is used. Equations 9 and 10, with the above constants, are used for the non-Newtonian viscosity case and the field dependent viscosity cases. It will be appreciated that in other embodiments, somewhat different parameters may be used without departing from the spirit and scope of the present invention.

III. Voltage Threshold Addressing Techniques

Under a voltage threshold addressing approach, the velocity of the particles goes from substantially zero, below a lower voltage level, (e.g. a threshold level), to a relatively high velocity, at a voltage equal to or greater than the threshold level. In certain embodiments, this increase in velocity occurs as the voltage increases by a factor of two or three (i.e., as the voltage goes from V/2 to V or from V/3 to V, which is referred to as "V/2" or "V/3" addressing, respectively), and the change may occur in a non-linear manner. The velocity of the particles at the higher voltage is substantially larger when compared with the velocity of the particles at the lower voltage. A threshold voltage lies between the lower voltage and the higher voltage such that a voltage at or above the threshold voltage will cause the particles to move at this higher velocity.

Figure 2:
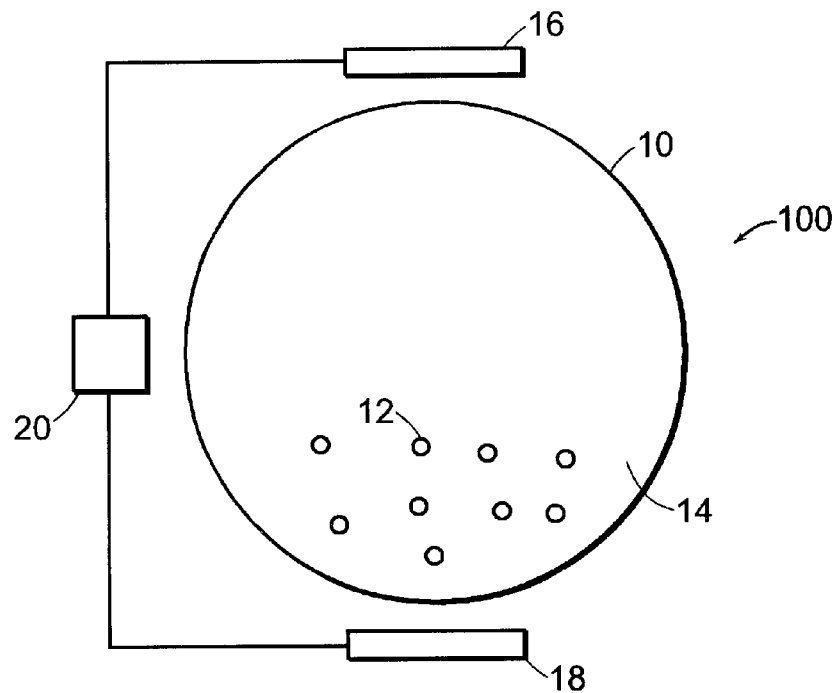
FIG. 2 shows a schematic depiction of a capsule containing particles that move under an applied voltage at or above a threshold value, according to the invention.
Figure 4:
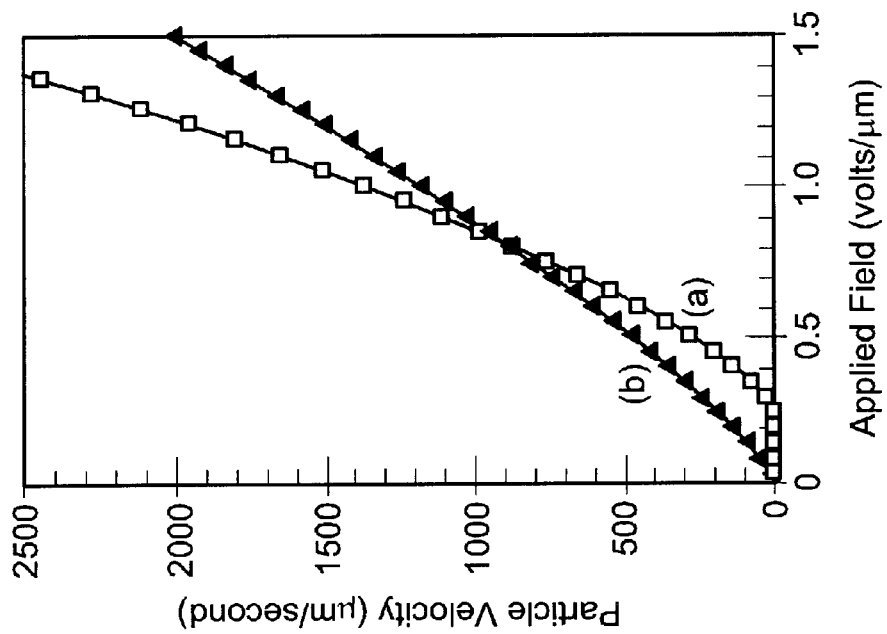
FIG. 4(a) shows the velocity of electrophoretic particles having a field dependent zeta potential in a fluid obeying the Herschel Bulkley model for viscosity as a function of applied field, according to the invention.
FIG. 4(b) shows the velocity of electrophoretic particles having a field dependent zeta potential in a fluid having a constant viscosity as a function of applied field, according to the invention.
Figure 3:
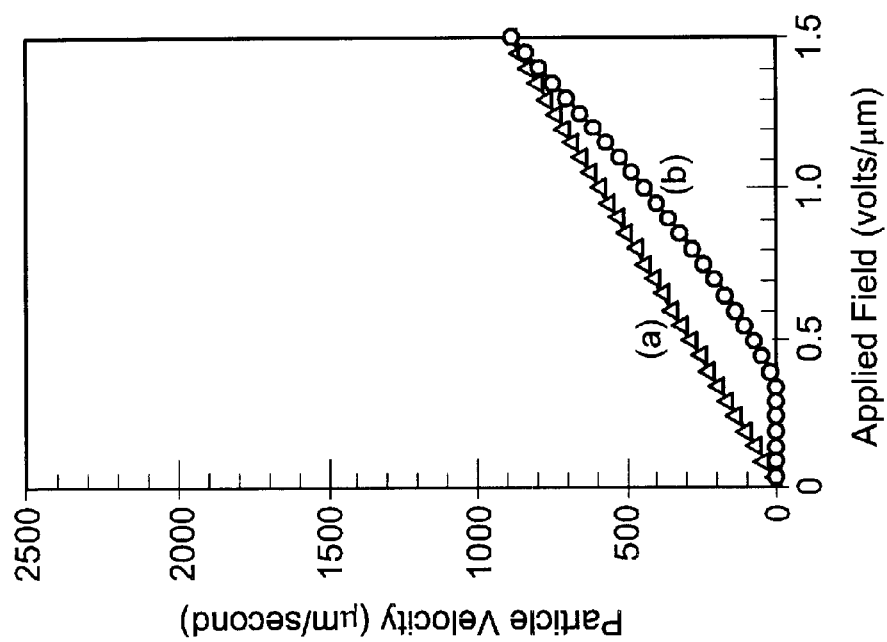
FIG. 3(a) shows the velocity of electrophoretic particles having a constant zeta potential in a fluid having a constant viscosity as a function of applied field, according to the invention.
FIG. 3(b) shows the velocity of electrophoretic particles having a constant zeta potential in a fluid obeying the Herschel Bulkley model for viscosity as a function of applied field, according to the invention.

Now referring to FIGS. 1 and 2, a capsule 100 has a capsule wall 10 that defines the capsule 100. A carrier medium 14 (also referred to as a suspending medium, suspending fluid, or carrier fluid) is contained within the capsule 100. Particles 12 (for example, pigment particles) are suspended in the carrier medium 14. A source of voltage 20 provides voltage to the capsule 100 via two electrodes 16, 18. In FIG. 1, a voltage below the threshold voltage is applied to the capsule 100. The particles 12 remain substantially stationary in the carrier medium 14. However, in FIG. 2, a voltage at or above the threshold voltage is applied to the capsule 100. The particles 12 move at a velocity that is rapid compared to the velocity of the particles 12 shown in FIG. 1.

Figure 6:
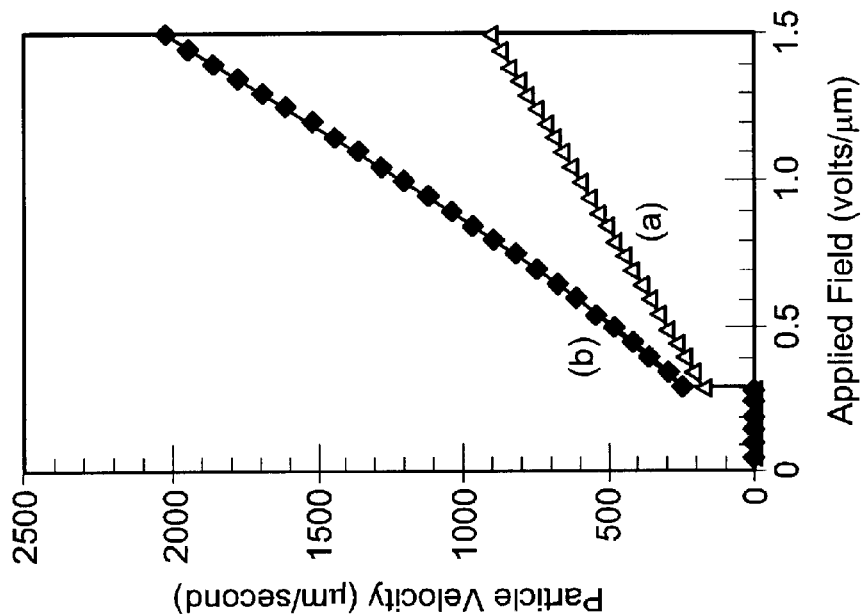
FIG. 6(a) shows the velocity of electrophoretic particles having a constant zeta potential in a fluid having a constant viscosity, with the addition of a particle sticking threshold, as a function of applied field, according to the invention.
FIG. 6(b) shows the velocity of electrophoretic particles having a field dependent zeta potential in a fluid having a constant viscosity, with the addition of a particle sticking threshold, as a function of applied field, according to the invention.
Figure 5:
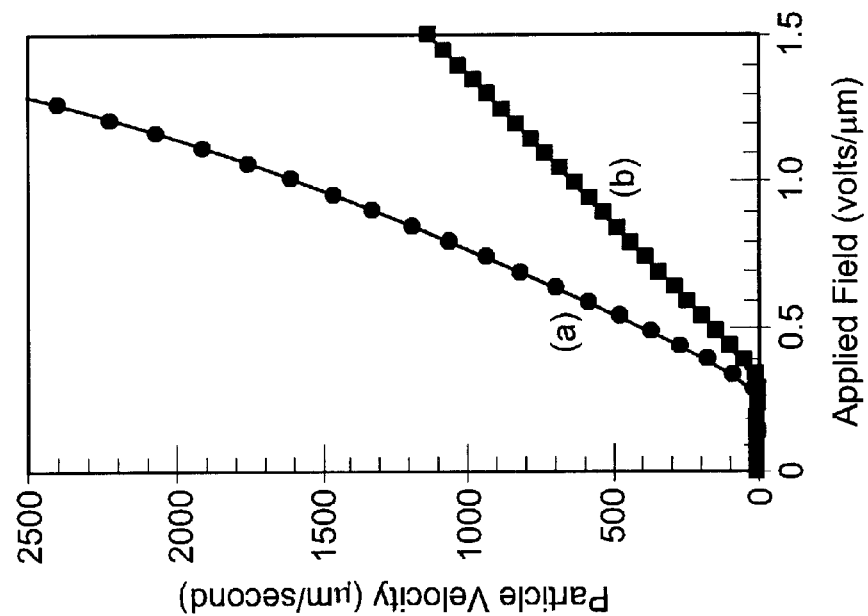
FIG. 5(a) shows the velocity of electrophoretic particles having a field dependent zeta potential in a fluid having a field dependent Herschel Bulkley model for viscosity as a function of applied field, according to the invention.
FIG. 5(b) shows the velocity of electrophoretic particles having a constant zeta potential in a fluid having a field dependent Herschel Bulkley model for viscosity as a function of applied field, according to the invention.

Examples of such velocity-voltage relationships are shown in FIGS. 3–6. FIG. 3(a) shows the usual situation in which the particle charge and the fluid viscosity are constant and there is no threshold due to particle sticking. In this case, the particle velocity increases linearly from zero with applied electric field. In FIG. 3(b) the particle charge is still constant, but the fluid that the particles move in has a yield stress. Below a certain electric field the particles cannot move in this fluid. Above the threshold the particles can move and the apparent viscosity continues to decrease, allowing the particle velocity to increase faster than linearly. FIG. 4(a) shows a system with this same fluid, but the particle charge is now a function of the applied field. Once again, a threshold voltage must be exceeded for the particles to move, but the velocity increases even faster than in 3(b). FIG. 4(b) shows the effect of having a field dependent particle charge, but a constant viscosity fluid. The velocity increases faster than in 3(a), but there is no threshold voltage. FIGS. 5(a) and 5(b) show the result of having a fluid whose properties change as a function of applied field. Both have a threshold due to the yield stress of the fluid, but the one in which the particle charge is also a function of the applied field shows the most rapid increase in velocity as the voltage is increased. An additional small threshold due to particle sticking at the wall would have little effect on 3(b), 4(a), 5(a), or 5(b) because they already have a significant threshold from the rheology of the liquid. The two constant viscosity examples (FIGS. 3(a) and 4(b) have no threshold. The addition of a particle sticking threshold would keep the velocity at zero until the threshold was reached, followed by a jump up to the existing curve at that applied field. This behavior is shown in FIG. 6. These Figures are illustrative of the concept of a nonlinear velocity-voltage response but are in no way limiting. Other velocity-voltage functions also are useful.

A number of techniques and mechanisms can be used alone or in combination to accomplish a large increase in velocity upon application of an electric field at or above a threshold voltage. In one embodiment, such a large increase can be represented by a function of time such as a step-change, or more generally, an increase of velocity that is substantially abrupt over a small range of applied field, and which remains at an elevated level at still higher applied fields. Examples of changes of this type are presented below. Some of the techniques and mechanisms to achieve such abrupt changes in velocity with applied field can be grouped into three categories: (1) adherence of particles to each other and/or to the walls of the capsules or device; (2) use of a structured medium through which the particles move; and (3) non-linear field effects on the motion of the particles. These techniques are described below.

A. Adhesion

As described above, some particles exhibit a slight tendency to adhere to the wall of a capsule. If the potential is below some threshold value, the particles will not leave the wall. Typically, this threshold is quite low and results in a long switching time between states. However, the surface chemistry of the components of the system can be manipulated to enhance the tendency for the particles to stick to the inside of the capsule wall (or display cell wall) to provide a significant threshold value.

Because not all the particles are in contact with the wall, if only the wall surface is modified, a large effect typically will not be achieved. Under a first voltage, the particles move to a side of the capsule and multiple layers of particles are positioned at varying distances away from the wall. When the voltage is reversed, the particles that are not in contact with the wall move to the opposite wall without the need to apply a potential at or above the threshold value. Thus, in certain embodiments, the particles are caused not only to adhere to the wall, but also to adhere to each other when they are in the vicinity of the wall.

When the level of a dispersant is low, the particles, such as titanium dioxide ("$TiO_2$") particles, aggregate with each other and become attached to the walls of the capsule. A dispersant is a surface active agent (surfactant) capable of aiding the creation of or stabilization of a dispersion of one material in another material in which it is substantially insoluble. That is, the dispersant helps to create or maintain small droplets or particles of the dispersed phase in a second, continuous phase by decreasing the work necessary to break the particles and/or by decreasing the tendency for the small particles to re-aggregate. In the current context, the dispersed material is a solid that is dispersed as small particles in a liquid in which it is substantially insoluble. Thus, by controlling the type and amount of dispersants used, the magnitude of the particle-particle and particle-wall interactions can be selected. Thus, in effect, the threshold voltage can be selected. For example, in the case of dispersants such as OLOA 1200, the functional groups that are believed to physically anchor the dispersant material to the pigment particle surface are polyamines, such as diethylene triamine, which are attached to a polyisobutylene chain by a succinimide or succinamide group. By varying the molecular weight of the oil soluble polyisobutylene chain, the thickness of the steric layer on the particles can be adjusted, thus controlling the particle-particle and particle-wall attraction. Dispersants for nonaqueous suspensions or dispersions work by providing steric barriers and often combined steric and electrostatic barriers that prevent the particles from aggregating. For pigment particles for electrophoretic displays, the dispersant usually must be polymeric to provide a sufficient barrier. By reducing the magnitude of the steric barrier a controlled aggregation can be achieved.

In general, block or graft copolymers can be used as dispersants when one of the block materials is soluble in the carrier medium and the other component has limited solubility in the carrier medium, or has a specific affinity for the particle surface. The block with the affinity for the particle surface serves as an anchoring group, while the soluble block provides the steric barrier around the particle. In the case of the OLOA 1200 mentioned above, the polyisobutylene is the soluble component while the polyamine can interact strongly with, for example, a titanium dioxide, silica, or alumina surface. Soluble blocks suitable for use in electrophoretic systems include polyisobutylene, poly (ethylene-co-butylene), polybutadiene, polyethylhexylacrylate, polyethylhexylmethacrylate, poly(ethylhexylacrylate-co-styrene), polyhydroxystearic acid, polystyrene, polydimethylsiloxane, etc. The suitability depends on the nature of the carrier medium. The anchoring component can be a polymer containing cationic functionality, such as a polyamine or polyvinylpyridine. It can be a polymer containing anionic finctionality, such as polyacrylic acid or other polymers containing carboxylate, sulfonate, phosphate, or phosphonate groups. It can be a polymer containing nonionic polar functionality, such as polyethylene oxide or a polyamide. The anchoring can also be enabled by functional end groups on the soluble polymer block; or by functional groups along the soluble backbone as long as the number of monomer units between groups allows loops of soluble polymer to extend out into the carrier medium. Commercial dispersants of use in electrophoretic displays include, but are certainly not limited to, the following examples: OLOA 371 (Chevron), Solsperse 17000 (Avecia), Solsperse 13940 (Avecia), Solsperse 3000 (Avecia), Zephrym PD5464 (Uniqema), Zephrym PD2246SF (Uniqema), Zephrym PD2234 (Uniqema), Zephrym PD1000 (Uniqema), Ganex V216 (ISP Technologies), and DC5225C (Dow Corning).

Chemisorbing oil soluble chains of controlled molecular weight to the surface of the particles can create similar behavior. The soluble polymer chains referred to here are the same as those discussed above for dispersants. The difference is in the covalent bonding of the chains to the particle surface. While dispersants are only physisorbed to the surface and are in a dynamic equilibrium with dispersant molecules in solution, the chemisorbed polymer cannot leave the particle surface. The latter approach has the advantage of not requiring the presence of an equilibrium concentration of the dispersant in the bulk suspending fluid, thus allowing a lower conductivity to be maintained. Examples of the behavior of systems with a threshold based on adhesion are shown in FIG. 6.

B. Structured Medium

Another way to hinder the motion of the charged pigment particles below a threshold voltage is by making the fluid through which they move "non-Newtonian." A Newtonian fluid is one for which there is a linear relationship between the shear stress and the shear rate, and the shear stress is zero at zero applied shear rate. That is, the apparent viscosity (i.e., the shear stress/shear rate) is a constant over all shear rates and shear stresses. All other fluids are non-Newtonian. Non-Newtonian fluids are those that do not exhibit such a linear relationship, but rather exhibit a non-linear relationship in shear stress to changes in shear rate applied Equivalently, the apparent viscosity is not constant over all shear rates and shear stresses. Some non-Newtonian fluids can behave like Newtonian fluids over some range of flow conditions. By creating a structured or complex fluid, a carrier medium containing particles has an apparent viscosity that is a function of the shear force exerted on it by the pigment particles when they are acted on by the applied electric field. Alternatively, the viscosity of the structured fluid itself can be directly influenced by the applied electric field.

1. Gelled Medium

The shear stress that a charged particle exerts on the fluid surrounding it is a function of the applied electric field, the particle charge, and the particle size. For a given particle, the shear stress that it exerts in a traditional electrophoretic display is generally proportional to the applied field. In a Newtonian fluid, this effect translates into a linear increase in the electrophoretic particle velocity with increasing applied electric field (i.e., with increasing voltage). See FIG. 3(*a*). In contrast, a fluid with a yield stress and a rapidly decreasing apparent viscosity above the yield stress can facilitate a system for which the particle velocity is zero below the threshold voltage and is significant at or above the threshold voltage. See FIG. 3(*b*). The velocity of the particle increases at a rate that is proportional to the applied voltage and inverse to the viscosity, as described by Equation 7 above. Therefore, decreasing the viscosity as a function of increased voltage, all other parameters being held substantially constant, results in a non-linear velocity profile with applied voltage.

a. Functionalized Polymers

Hydrocarbon fluids arc typically used in electrophoretic displays as a carrier medium to suspend the particles. One way to convert such fluids into a structured fluid with the characteristic described above is to add a polymer. The polymer can be composed of a soluble backbone with a small number of functional groups along the backbone that can physically associate with the functional groups on other polymer chains. One alternative polymer architecture is an "ABA" block copolymer with an oil soluble B block, such as polyisobutylene or poly(ethylene co-butylene), and A blocks that associate in the oil. The A blocks form groups (or micelles) comprised of more than two A groups, such that a cross-linked system is developed.

Polymer concentration as used in this disclosure means the concentration of the polymer in solution, usually expressed as grams of polymer per liter of solution, or other similar units. At low concentrations the polymer molecules are individual molecules in a sea of solvent. The polymer chain interacts with the solvent and other parts of the same chain. The concentration at which the polymer coils of one molecule begin to overlap with neighboring molecules is referred to as the overlap concentration, often symbolized by $c^*$. Above this concentration the properties of the polymer solution change as the polymer molecules interact with each other as well as the solvent. The overlap concentration is a function of the molecular weight of the polymer, the "stiffness" of the polymer, and the polymer-solvent interaction.

As long as the polymer concentration is above the overlap concentration, such polymeric systems will form a continuous, physically cross-linked network in solution. The value of the yield stress is a function of the polymer concentration, the number of functional groups per chain, and the strength of the interaction between the functional groups. The yield stress increases with an increase in any of these three variables.

Thus, in this system, at or above a threshold voltage, the particles move more easily through the carrier medium than they do below the threshold voltage. The particles disrupt the structure of the carrier medium as they pass through the medium. Such a structure is expected to reform rapidly after being disrupted (or "broken") by the passage of the pigment particles through it. A rapidly reforming structure reduces the waiting time necessary before the next line can be addressed. Until the structure reforms, the particles are able to move below the threshold voltage. Thus, the faster the structure reforms, the faster the entire display can be changed, but the single switching time between states does not change. Also, the polymer molecules should be nonionic, or carry a net zero charge, so that they do not translate in an applied electric field.

b. Particulate Networks

Another way to create a network structure that will prevent or impede the motion of the pigment particles is to form a floc structure composed of structure-forming particles that have a net zero charge, which are different particles from the pigment particles. The structure-forming particles flocculate to form the gel but do not translate in an applied electric field. As with the polymer systems discussed above, the network of structure-forming particles should reform quickly after being broken down by the shearing action of the pigment particles passing through it. It is also useful to create the floc network with as small a volume fraction of structure-forming particles as possible. The minimum apparent viscosity that can be achieved when the floc structure is completely disrupted is a function of the volume fraction of structure-forming particles. The minimum apparent viscosity becomes a rapidly increasing function above about 10% volume fraction. From 0 to about 10 volume percent of particles the viscosity of a stable dispersion will follow the Einstein relationship: $\eta/\eta_0 = 1 + 2.5\phi$, where $\eta$ is the apparent viscosity of the dispersion, $\eta_0$ is the viscosity of the solvent, and $\phi$ is the volume fraction of particles in the dispersion. Above about 10% the viscosity increases more and more rapidly. The flocculation can be created by a number of mechanisms, as follows.

i. Dispersion Force Attractions

One flocculation mechanism is to reduce the stabilizing influence of a dispersant in the carrier medium in a controlled fashion in order to attain a particle-particle attraction that is sufficient to produce the desired yield stress. A sufficient particle-particle attraction is usually greater than about 5 kT, where k is the Boltzmann constant and T is the absolute temperature. The laws of thermodynamics teach that average kinetic energy of the molecules in a sample is given by 1.5 kT. Hence, a value of about 5 kT is sufficient to result in a yield stress that will not be disrupted by simple thermal agitation, at conventional ambient temperatures.

ii. Depletion Flocculation

The floc network also can be created by the presence of a non-adsorbing polymer. The ratio of the particle size to the polymer size and the concentrations of each must be balanced for this embodiment to function properly. However, it will produce a floc structure that will continue to reform after each shear event. Depletion flocculation is caused by the exclusion of the non-adsorbing polymer molecules from the space between two particles when that space is equal to or smaller than the size of the polymer molecule in solution. The osmotic pressure difference between the area depleted of polymer and the rest of the solution results in a net force of attraction between the two particles.

iii. Anionic/Cationic Functionalized Particles

A controlled floc network also can be established through the use of ionically functionalized particle surfaces. The floc particle surfaces are chemically modified, for example, by chemisorbing the appropriate mix of molecules onto the surface, to create a surface that is predominately lyophilic, but that has a very low density of both cationic and anionic functional groups. The number of charge sites should be chosen such that the floc particle approximately has a net zero charge in order to prevent it from migrating in the applied electric field. By placing the charge groups far enough apart, the floc particle will act like a partially neutralized colloidal particle for which the charge patches of opposite charge can attract each other on a local scale. The opposite charge patches enable the structure-forming particles to form the network structure. This network structure provides the yield stress, which impedes the motion of the pigment particles below the threshold. Thus, this floc network is expected to be strong enough to resist the motion of pigment particles under an electric field, until the threshold electric field is exceeded, at which point the floc network gives way to the motion of the pigment particles.

2. Inverse Electrorheological Fluids

In another embodiment, inverse electrorheological ("ER") fluids can be used to provide threshold addressing. Conventional ER fluids typically are fluids that develop a yield stress when a strong electric field is applied across them. In contrast, an inverse ER fluid has a high apparent viscosity or a yield stress in the absence of a field. At a sufficiently high applied electric field, the inverse ER fluid rapidly becomes less viscous. Inverse ER fluids, examples of which are presented later, are compatible with the voltage threshold addressing approach.

For example, either a particle floc structure or a functionalized, oil soluble polymer can be used as a component of the inverse ER fluid and the formed network can be disrupted at a voltage above a threshold voltage. In certain inverse ER fluids composed of anionic/cationic functionalized particles in a floc structure the structure-forming particles described above play a more active role than in non-ER situations. When a sufficiently high voltage is applied, the paired charge sites on adjacent structure-forming particles can move apart and temporarily disrupt the floc network, allowing the charged pigment particles to move through the capsule or across the display. In other embodiments of inverse ER fluids composed of polymers, a polymer can have a lyophilic polymer backbone either with functional end blocks or with a low density of functionalized groups along the polymeric chain. Lyophilic polymers suitable for use in electrophoretic systems include polyisobutylene, poly(ethylene-co-butylene), polybutadiene, polyethylhexylacrylate, polyethylhexylmethacrylate, poly(ethylhexylacrylate-co-styrene), polyhydroxystearic acid, polystyrene, polydimethylsiloxane, etc. The suitability depends on the nature of the carrier medium. The functional groups can be cationic, such as an amine or vinylpyridine. They can be anionic, such as a carboxylate, sulfonate, phosphate, or phosphonate group. If the functional groups are anionic and cationic groups, there should be an approximately equal number of them so that the polymer has approximately a net neutral charge and does not substantially migrate in the applied electric field. The ion pairs should be strong enough so that they do not dissociate when a voltage below the threshold voltage is applied but do dissociate and move away from each other when a voltage above the threshold voltage is applied. The individual functionalized segments of the polymer can move in the field, but the entire polymer molecule stays essentially where it started. While the ion pairs are dissociated, the charged pigment particles can more easily move through the inverse ER medium.

C. Non-linear Field Effects

1. Field Dependent Particle Mobility

Typically, the force applied to a charged particle in an electric field in a low dielectric medium is just the particle charge times the applied electric field. Thus, there is a linear relationship between the applied electric field and the shear stress exerted by the particle, which leads to a linear increase in particle velocity in a Newtonian fluid. That is, if the field is doubled, the force on the particle is doubled, causing the shear stress exerted by the particle on the suspending medium to double, and, in a Newtonian fluid, the velocity of the particle will be doubled. FIG. 3(a) shows the relationship between particle velocity and applied electric field for this circumstance. The surface of pigment particles can be functionalized with suitable ion pairs. For example, an anionic site is placed on the particle and is balanced with a cationic counter ion (or vice versa).

For electrophoresis, one needs to get the counter ion (the cation in this case) away from the charge site on the particle and outside of the shear plane. The solvent inside the shear plane travels with the particle. The effective charge on the particle is the net charge inside this shear plane. Thus, if all the counterions remain at the surface, within this shear plane, the particle will be effectively uncharged. One can cause additional counterions to move away from the particle surface by increasing the electric field under the right conditions. The field needs to be high, as is contemplated in the present invention, and the ion pairs need to be weak enough that the increased field is sufficient to overcome the attraction between the ions.

By controlling the strength of these ion pairs, the charge of a particle can be controlled as a function of an applied electric field. For example, the strength of the ion pairs can be controlled by manipulating the amount of steric hindrance around the charge group, by varying the degree of charge delocalization, or by varying the dielectric constant of the solvent. In this way particles can be created for which the charge increases with increasing electric field, and the shear stress exerted by the particle on the suspending medium will increase faster than the usual linear relationship. FIG. 4(b) shows the effect of such a field dependent particle charge on the electrophoretic velocity of the particle in a Newtonian medium. This effect, in combination with a structured medium for which the apparent viscosity is decreasing with increasing shear stress, leads to a significantly steeper increase in electrophoretic velocity with increasing electric field than is seen for the constant charge particle in a Newtonian medium. Examples of this effect are shown in FIGS. 4(a), 4(b), and 5(a).

2. Medium (IER Fluids)

Inverse electrorheological fluids also can exhibit nonlinear effects. As explained above, inter-molecular or inter-particle attachments, which act as physical cross-links, provide the polymer or particulate networks with their non-Newtonian flow properties. As described above, in inverse ER fluids, these intermolecular or inter-particle attachments are disrupted by electric fields of sufficient magnitude. When the number of attachments that are disrupted increases as the field increases, the apparent yield stress and apparent viscosity curve will decrease as the field is increased. This effect, in combination with the non-linear behavior of the pigment particles discussed above, will lead to a much sharper jump in particle velocity as a threshold voltage is exceeded. FIG. 5(a) combines a field dependent viscosity fluid with particles that have a field dependent charge. FIG. 5(b) shows the effect of applied electric field on the particle velocity for a system with a field dependent viscosity with constant charge. Both have the desired zero velocity below the threshold, but the combination of effects in 5(a) show a sharper increase in velocity above the threshold as compared to 5(b).

IV. Inverse Electrorheological Gating Techniques

As an alternative, instead of using the passive matrix "select" and "data" lines to carry out a V/2 or V/3 addressing scheme, the "select" lines can be used to apply AC voltages of various amplitudes and frequencies to a display of capsules. If a polymeric or particulate network structure in the suspending medium of the capsules can be disrupted by this AC field, a DC field applied on the "data" lines can be used to move the pigment particles through the suspending medium of capsules in a display only on the selected line of the display. The suspending fluid of the capsules addressed by the unselected lines (i.e., the absence of or an insufficient about of an AC voltage in capsules of the display) presents an insurmountable yield stress for the pigment particles under the same DC field, and the pigment particles do not move in the capsules addressed by these unselected lines.

Figure 7:
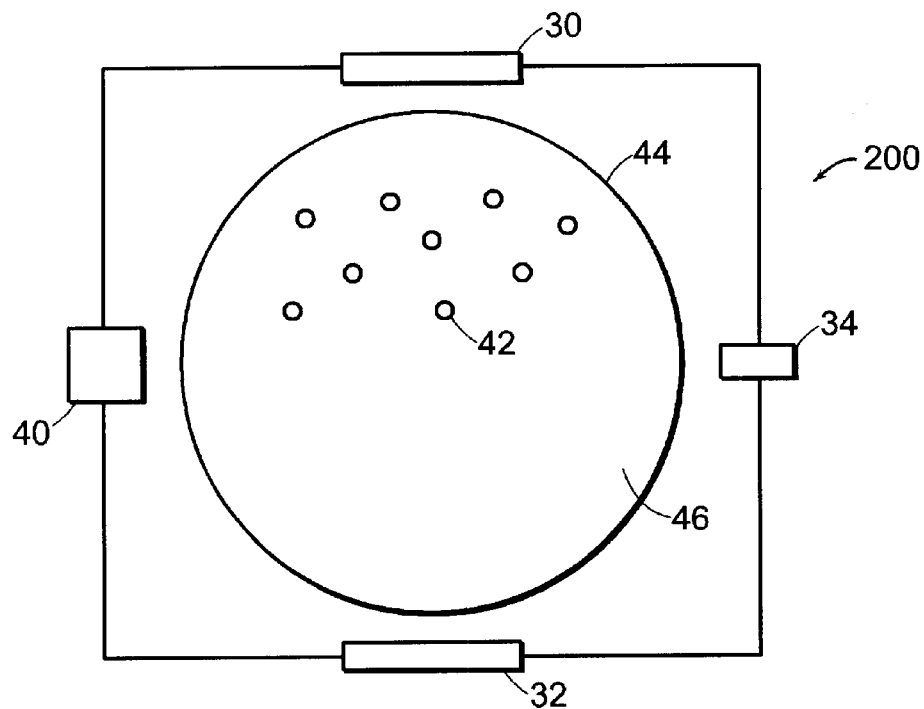
FIG. 7 shows a schematic depiction of a capsule containing particles that do not move under an applied AC voltage below a threshold value and an applied DC addressing signal, according to the invention.
Figure 8:
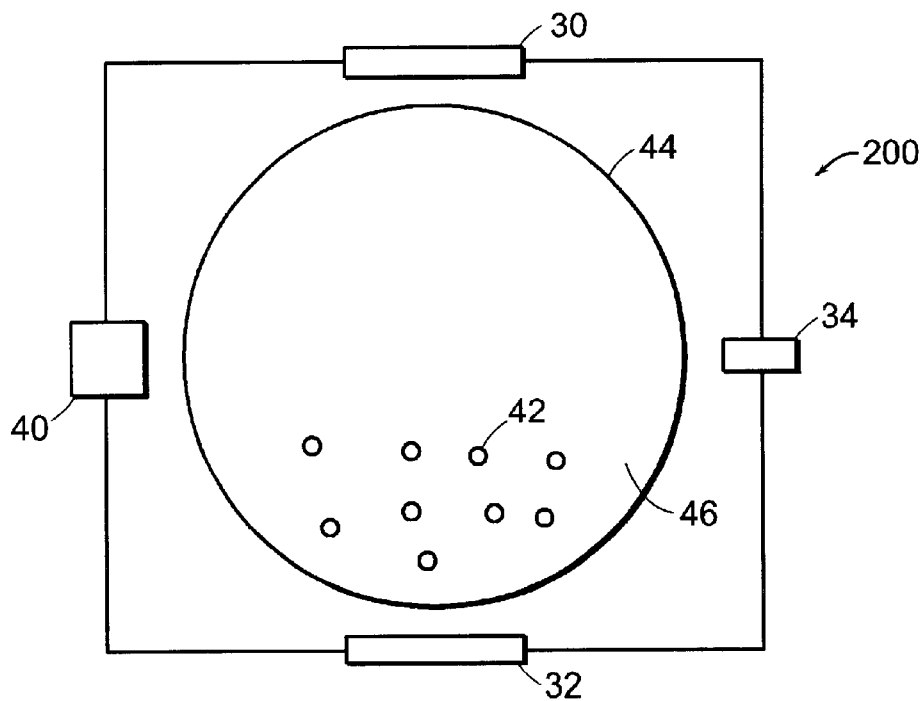
FIG. 8 shows a schematic depiction of a capsule containing particles that move under an AC applied voltage at or above a threshold value and an applied DC addressing signal, according to the invention.

For example, and referring to FIGS. 7 and 8, a capsule 200 is defined by a capsule wall 44 and contains a suspending medium 46 and pigment particles 42. The suspending medium 46 is an ER fluid. A DC voltage, generated by a voltage generator 34 and applied through electrodes 30, 32 cannot move the pigment particles 42 (FIG. 7). However, when an AC voltage, generated by a second voltage generator 40, is applied to the capsule 200 through the electrodes 30, 32, and the DC voltage is applied, the particles 42 move across the capsule 200 (FIG. 8). The AC voltage disrupts the network structure of the suspending medium 46. Examples of several polymeric and particulate network systems are described below.

A. Polymeric Networks

1. Controlled Ion Pairs

One suspending fluid that is suitable for inverse electrorheological gating is a substantially soluble polymer backbone with an approximately equal number of anionic and cationic functional groups either in the backbone or on grafts along the backbone. The density of functional groups should be low (<2 mole %). This polymer is described in more detail above. Generally, the functional groups can form intermolecular ion pairs when the polymer is present above the overlap concentration, c*, as defined earlier. This network of polymers in the suspending medium can form a gel. A substance is a gel if it (1) has a continuous structure with macroscopic dimensions that is permanent on the time scale of an analytical experiment and (2) is solidlike in its rheological behavior. (See, for example, Flory, P. J. *Discussions of the Faraday Society* 1974, 57, 7) The strength of attraction between these ion pairs can be manipulated, for example, by controlling the amount of steric hindrance around a charge group (for example, attaching a tri isoamyl ammonium group to the polymer or using tetra isoamyl ammonium as the counterion), by varying the degree of charge delocalization (for example, using the picrate ion, which has a highly delocalized charge that produces a weaker ion pair), or by altering the dielectric constant of the solvent (for example, raising the dielectric constant from 2 to 4 will weaken the ion pair interaction by a factor of 2). Controlling the strength of these ion pairs allows for control of the strength of the physical cross-links in the gel system. Thus, by appropriately setting the strength and number of cross-links, the yield stress of the gel is set to be large enough to prevent the pigment particles from moving under the data line DC field. When the AC field is applied to a select line, it disrupts the ion pairs, the gel liquefies, and the pigment particles move across the capsules addressed by the select line in the display device. When the AC field is removed, rapid diffusion of the polymer segments allows ion pairs to recombine quickly, and the gel is restored in a rapid manner. The gel should be restored in a time substantially less than the duration that a display will hold a particular image, for example, in less than one-tenth the duration of the image.

2. Zwitterionic Groups

Zwitterionic groups also can be added to the soluble polymer backbone to produce a suspending medium that is an IER fluid with properties that allow inverse electrorheological gating. Zwitterionic groups contain both an anionic and a cationic charge in close proximity to each other, usually with one to three methylene groups separating the charges. These groups can interact with one another in organic solvents. This interaction provides physical cross-links in the suspending medium to form a gel. An AC voltage of sufficient amplitude and correct frequency will disrupt these interactions, allowing the gel to liquefy. For example, applied fields with amplitudes in the range of 100 to 10,000 volts/cm and frequencies in the range of 10 Hz to 10 MHz can be expected to provide acceptable performance. Again, the rapid diffusion of the polymer segments leads to a rapid restoration of the solidity of the gel when the AC field is removed. The gel can be expected to regain 50% of its structure in less than one second.

B. Particulate Floc Networks

1. Controlled Ion Pairs

A network in a suspending medium, such as a controlled floe network, also can be established through the use of ionically functionalized particle surfaces. The structure-forming particle surfaces are chemically modified (for example, by chemisorbing an appropriate mix of molecules onto the surface) to create a surface that is predominately lyophilic, but that has a relatively low density of both cationic and anionic functional groups. This can be accomplished, for example, by treating the particle surface with functional silanes, such as aminopropyltriethoxy silane, (trihydroxysilyl)-propylmethylphosphonate, or the like. The number of charge sites should be chosen so that the structure-forming particle has approximately a net zero charge and that it will not substantially move under an applied electric field. By placing the charge groups far enough apart, the structure-forming particle will act like a partially neutralized colloidal particle for which the charge patches of opposite charge can attract each other on a local scale. The application of AC voltage to the select line tends to disrupt the interaction of the structure-forming particles in the floc network of the suspending fluid in capsules addressed by the select line. This disruption can cause the suspending medium to liquefy, allowing the substantially immobilized pigment particles to move under an applied DC field in capsules addressed by the data line(s). Field strengths and time periods such as those described above can be expected to be effective in this situation as well.

2. Zwitterionic Groups

Zwitterionic groups on structure-forming particles also can be used to produce suspending medium suitable for inverse electrorheological gating techniques. If zwitterionic groups are not rigidly attached to the floc particle surface, but are on the free ends of lyophilic polymer chains, which themselves are chemisorbed to the particle surface, the zwitterionic groups can be relatively mobile. An AC voltage applied to capsules addressed by a select line tends to disrupt the floc network in the suspending medium of each capsule addressed by the select line because of the ability for movement of the zwitterionic groups. This disruption causes the particulate floc structure to liquefy while the AC voltage is applied. The floe network reforms in the absence of the AC voltage that is sufficient to disrupt the floc network. Structure-forming particles, in some embodiments, do not diffuse as quickly as polymer chains, but the use of very small colloidal particles can allow a reasonably fast reformation of the floe network when the AC field is removed or falls below a value sufficient to disrupt the network. Field strengths and time periods such as those described above can be expected to be effective in this situation as well.

3. Dielectric Particles

Dielectric particles also can be used to advantage to create a floe network in a suspending medium for use as an inverse electrorheological fluid. In normal electrorheological fluids the dispersed dielectric particles line up between two electrodes under an applied AC field. Continuous strands form, creating significant resistance to any shearing motion perpendicular to the strands. Such fluids typically operate at a fairly high volume fraction of particles in order to attain a large yield stress. These dielectric particles can also be used to create inverse electrorheological fluids under certain conditions. For a short time after the AC field is applied, strings of flocculated dielectric particles are disrupted when the AC frequency is within a fairly narrow range, which depends on the particles. The cause of the disruption is the rotation of the particles that are not perfectly aligned perpendicular or horizontal to the field. (See, for example, Jones, T. B. Electromechanics of Particles, Cambridge University Press: New York, N.Y., 1995).

Thus, a dispersion of dielectric particles, at considerably lower volume fraction than found in normal electrorheological fluids, is used to create a particulate floc network with an appropriate yield stress. We then take advantage of this rotation phenomenon to disrupt the network by applying an AC electric field on the select lines at the correct amplitude and frequency. As with the other inverse electrorheological gating techniques, this application of the AC electric field liquefies the suspending medium in capsules located along the select line, and allows the charged pigment particles to move across the capsules when a DC field is applied to the data line(s).

V. Full Color Displays with Passive Matrix Addressing and Randomly Coated Capsules Using the inverse electrorheological gating techniques described above together with encapsulated electrophoretic display techniques, a full color display can be provided without having to precisely align the capsules of a display on an electrode grid or use a color mask. Several species of capsules are present in such a display with each species of capsule containing one or more pigments or one or more pigments and one or more dyes and being capable of displaying one member of the chosen color set and either white or black. The several species of capsules are mixed in the correct proportions and coated randomly on a film. There should preferably be multiple capsules of each color within each pixel area. It is not consequential how a particular color is produced in a particular type of capsule. Capsules that operate using a colored particle and a different color of dye, or capsules that operate using particles of more than one color, would all be acceptable. In an embodiment of the present invention, the colors of the chosen color set are in separate capsules, and each type of capsule corresponding to a particular color contains a different fluid phase so that the inverse electrorheological behavior of each species is different. This allows each species to be addressed independently, even though a plurality of different species of capsules are addressed by the same select line.

Each color is designed with its own threshold voltage amplitude and/or frequency. Thus, frequency controlled liquefaction allows the capsule medium to be switched for each color separately. Once the AC voltage drops below the threshold of a given color capsule, that color no longer responds to the data line signals. Consider a display having three colors. If amplitude control is used, the AC field is first set to the highest voltage, thus liquefying all capsule media on the selected line. The data lines would be set for the color with the highest threshold value. The voltage would then be decreased to the intermediate threshold value and the data lines set for the intermediate threshold color. The capsules corresponding to the color with the highest threshold would no longer respond to signals on data lines, thus fixing those pixels in the display state that they assumed under the highest AC field. Finally, the threshold would be set to the lowest value and the data lines set for the last color. During this third addressing step, the colors corresponding to the two higher thresholds would remain unaffected. This scheme can, of course, be extrapolated to the use of additional capsule types if so desired. Because these rheological gating techniques allow full color displays to be created using passive matrix addressing without the need to address individual capsules, the cost of the displays can be significantly reduced from other display techniques.

Figure 9:
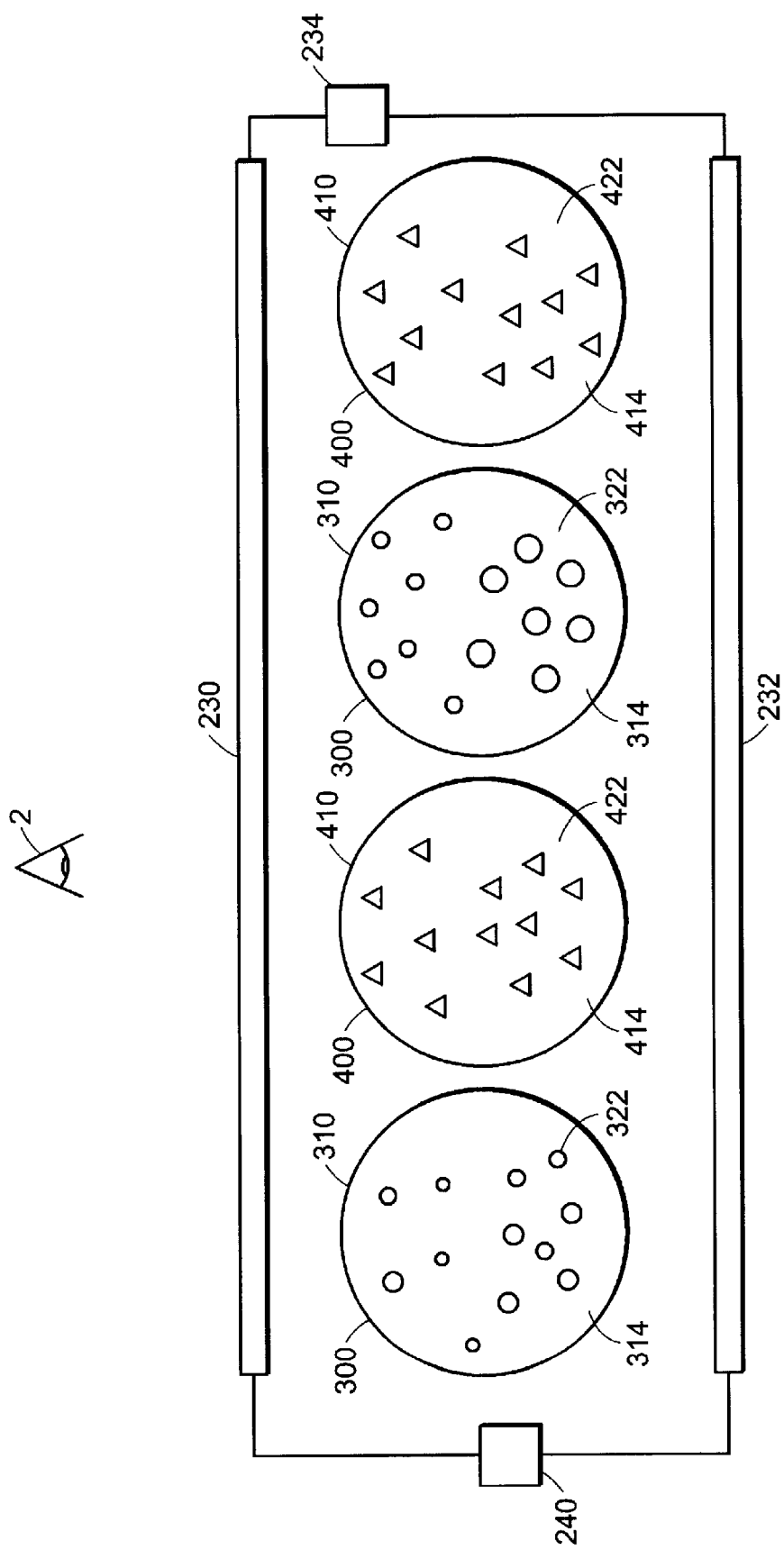
FIG. 9 shows a schematic depiction of a plurality of unaddressed capsules containing two different kinds particles and suspending fluids that have different threshold voltages, according to the invention.
Figure 10:
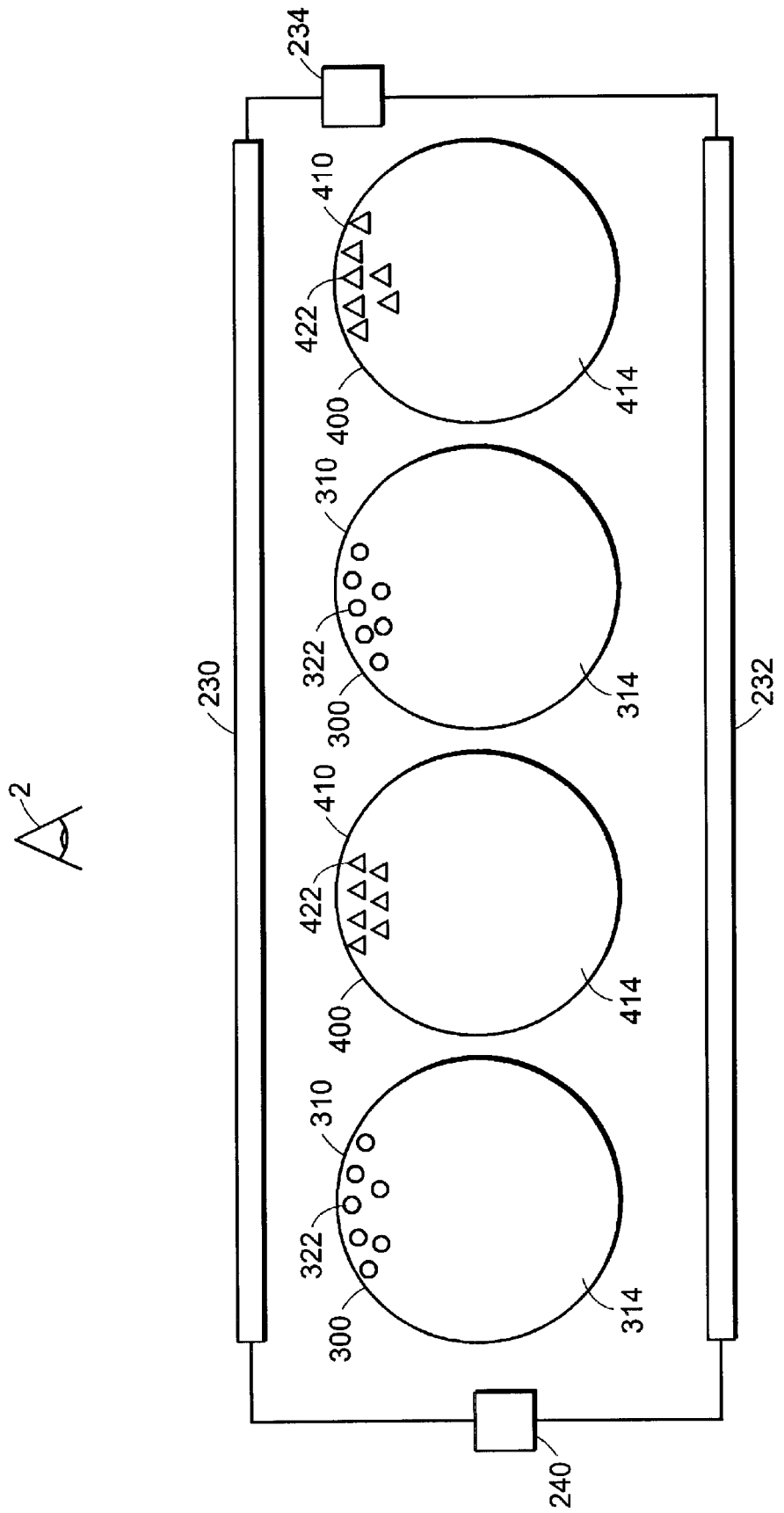
FIG. 10 shows a schematic depiction of a plurality of capsules containing two different kinds particles and suspending fluids that have different threshold voltages, that are addressed by a DC addressing signal and an AC field greater than the highest threshold voltage of the capsules, according to the invention.
Figure 11:
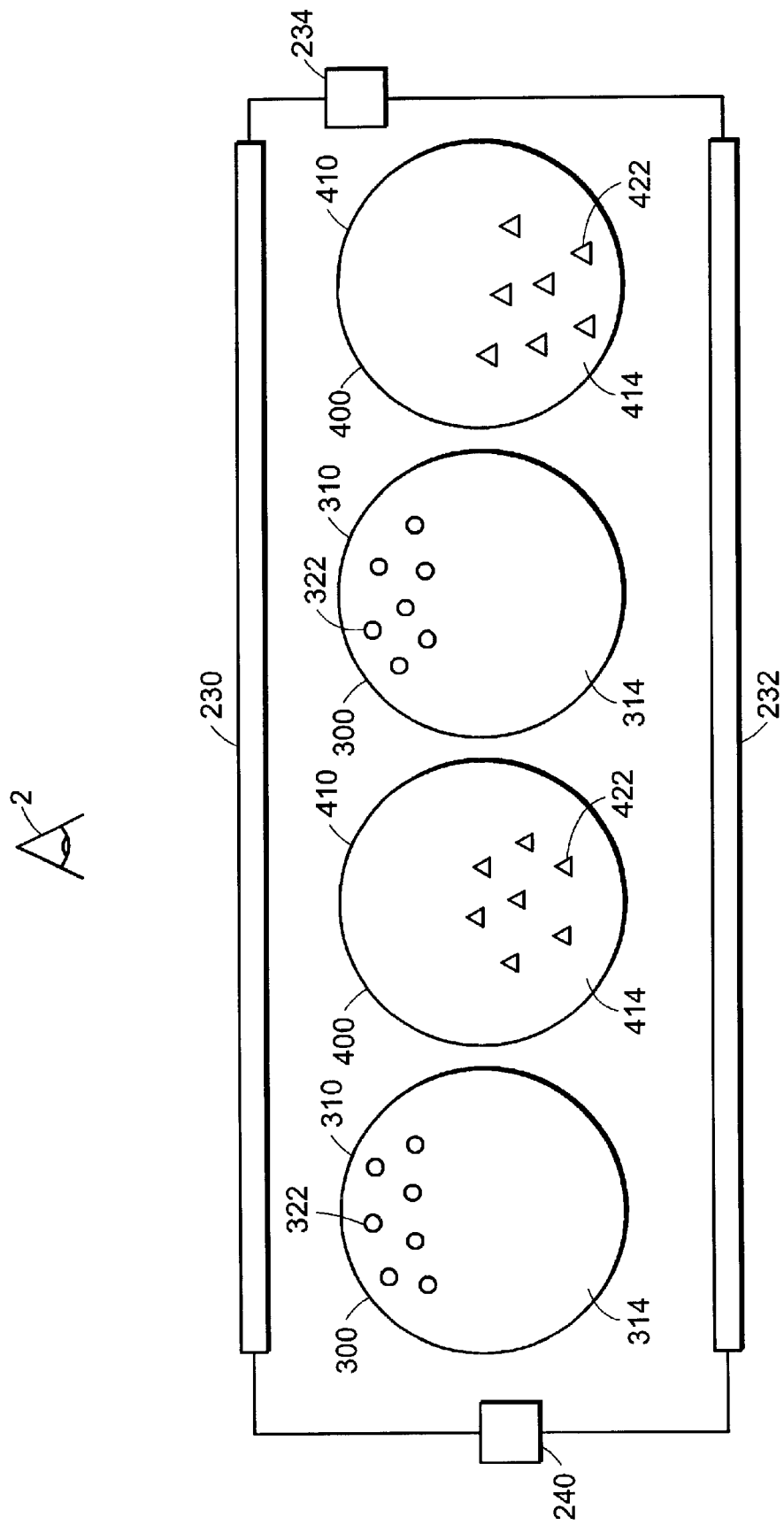
FIG. 11 shows a schematic depiction of a plurality of capsules containing two different kinds particles and suspending fluids that have different threshold voltages, that are addressed by a DC addressing signal and an AC field above the threshold value corresponding to the lower threshold for either of the two kinds of particles, according to the invention.

Now referring to FIGS. 9, 10, and 11, a schematic depiction of an encapsulated electrophoretic display is shown. Two types of capsule 300, 400 are situated between two electrodes 230, 232. AC or DC voltage is produced by voltage generators 234, 240, respectively, and is applied to the capsules 300, 400 through the electrodes 230, 232. One of the types of capsules 300 is defined by a capsule wall 310 and contains a first suspending medium 314 and a first species of particle 322. The second type of capsule 400 also is defined by a capsule wall 410 and contains a second suspending medium 414, and a second species of particle 422. Each species of particle 322, 422 and respective suspending medium 314, 414 has a different threshold voltage characteristic. For example, suppose that the capsules 300 containing the particles 322 and the suspending fluid 314 have a threshold voltage $V_{300}$ and the capsules 400 containing the particles 422 and the suspending fluid 414 have a threshold voltage $V_{400}$, where $V_{400}$ is greater than $V_{300}$. For example, assume further that the particles 322 and 422 all carry charge of the same sign, whether positive or negative. In one embodiment, these different species of particle 322, 422 can represent, for example, two different colors. For example, the particles 322 can be red, and the particles 422 can be green. Suppose that the suspending fluids 314 and 414 are both colored black. A viewer 2 observes the display.

The suspending medium 314, 414 in each species of capsule 300, 400 is different such that an AC field at a value lower than $V_{400}$ and greater than $V_{300}$ can only liquefy one of the suspending media, namely 314. In that case, the DC field, when applied, would move the particles 322 only in the capsules 300 where the suspending medium 314 has liquefied.

An exemplary explanation of how amplitude control is used follows. In FIG. 9, none of the capsules have been addressed, and the particles 322, 422 are randomly distributed within their respective capsules. The AC field first is set to the highest voltage (ie., a voltage that will liquefy all of the different suspending media, such as a voltage above $V_{400}$) and is applied to a particular select line in a region of the display to be addressed. The AC field liquefies all the suspending media 314 and 414 of the capsules 300, 400 along the selected line. The data lines are be set for the particles of the color with the highest threshold value for motion, (in the example, the particles 414) so as to address the capsules that are intended to be that color (i.e., capsules 400). Because all of the capsules 300, 400 contain liquefied suspending medium 314, 414, the particles 322, 422 in all of the capsules respond to the applied DC field. As shown in FIG. 10, all of the particles 322, 422 have moved toward the viewer 2. At this point, the viewer 2 sees a mixture of red and green particles.

The voltage is then dropped to a next highest threshold value (e.g., in the exemplary case, a voltage above $V_{300}$, but less than $V_{400}$) and a DC addressing field is applied to the data lines to address the particles having the color corresponding to the next highest threshold value (I.e., the particles 322). The capsules 400 that have a threshold voltage higher than the applied voltage would contain suspending fluid that is no longer liquefied, and the particles contained in the capsules 400 would not move in response to the DC voltage applied to the data lines. As shown in FIG. 11, a DC field of the polarity opposite to the polarity of the DC field that was applied in FIG. 10 is applied between the electrodes 230, 232. The particles 322 are caused to move in their capsules 300 so that the particles 32 are substantially removed from the side of the capsules 300 nearest the viewer 2. The net effect of these exemplary addressing steps is that a viewer 2 would see capsules 400 which appear substantially the color of the particles 422 (green) and capsules 300 which appear substantially the color of the suspending fluid 314 (black), for a net effect that appears green.

In the forgoing example, the sign of the charge on the two types of particles was assumed to be the same. If the charges are of opposite sign, one would only have to reverse the sense of one of the DC voltages applied to the data lines to obtain the same result by a stepwise process in which capsules having higher threshold voltage are addressed before capsule having a lower threshold voltage, the AC field is reduced, and the capsules having the next highest threshold voltage are addressed.

If a display containing more that two species of capsules is desired, one can iterate this process, finally setting the AC field to the lowest threshold value and addressing the particles corresponding to the last color by applying a DC voltage to the data lines. Once the AC voltage is set below the threshold of a given color capsule, the capsules of that color no longer responds to the data line signals. Because these theological gating techniques allow full color displays to be created using passive matrix addressing without the need to address individual capsules, the cost of the displays can be significantly reduced as compared to the costs of manufacturing displays operating according to other addressing techniques.

In an alternative embodiment in which a frequency-controlled liquefaction of a suspending medium is used, the presence of two different suspending media 314, 414 that liquefy under different frequency excitations can allow separate switching of each color by controlling the frequency of the AC field that is applied. One can envision this embodiment also being extended to a number of species of capsule greater than two.

VI. Polymer and Colloidal Particle Design

Many of the techniques described above use functionalized polymers, surface modified pigment particles or surface modified floc network particles. The modification of the pigment and floc network particles can be achieved by grafting onto their surfaces molecules that are soluble in the suspending medium. For small particles (several nanometers to several 10's of nanometers in diameter) these molecules can be, for example, octyl through octadecyl hydrocarbon chains. For larger particles, polymers that are soluble in the suspending medium must be grafted to the particle surface. If this solvated material provides a sufficiently thick layer around the particles, a stable dispersion can be created in which the particles behave as hard spheres. That is, when two particles collide, they will not stick to each other on impact, but will move away and continue as separate particles. As the thickness of this solvated layer is reduced from this point, the attraction between the particles at closest approach increases. Thus, by reducing the thickness of this solvated layer, the floc networks form in a controlled way. By replacing a fraction of the grafted soluble chains with chains that include a functional group on the end, one can create particles with the controlled functionality discussed earlier.

The ion pair approaches for both polymeric and particle based networks require the selection of sterically hindered ions and/or ions with delocalized charge. Such ions dissociate in low dielectric constant fluids. For example, materials such as tetra-isoamylammonium picrate can be added to a hydrocarbon oil to increase the conductivity of the oil. The tetra-isoamylammonium ion is a highly hindered cationic ion. The charge on the picrate anion is not localized at the phenolic oxygen but is distributed over the PI-electron system of the whole molecule, resulting in a weak electrostatic force field leading to weak ion pairs. Also, the strength of the ion pair is a function of the dielectric constant of the solvent.

VII. Temrerature Compensation of Threshold

The physical properties of the polymeric and particulate networks formed as well as the tendency for the ion pairs to dissociate in the embodiments above are functions of ambient temperature. Since the threshold voltage, the required AC electric field amplitude, and the required AC electric field frequency change with temperature, the above techniques work within a range of temperatures unless some adjustments are made. Because the phenomena are understood and their temperature behavior catalogued, the operating temperature range can be extended by monitoring the temperature of the display, and applying the fields at the amplitude and/or frequency required at that temperature. Although it is expected that to disrupt the network for the inverse electrorheological gating case, the required amplitude of the applied electric field decreases with increasing temperature, and the required frequency of the applied electric field increases with increasing temperature, the actual behavior will vary from system to system. The behavior of each specific system is characterized, and that information used to alter the amplitude and frequency of the applied field as a function of temperature.

We claim:

1. A method of addressing an electrophoretic display, the method comprising the steps of:
    (a) providing an electrophoretic display comprising a plurality of display elements, each of the display elements comprising:
        an encapsulating wall;
        a plurality of particles disposed within the encapsulating wall, at least one of the
        plurality of particles responsive to an applied electric field; and
        a carrier medium disposed within the encapsulating wall; and
    (b) providing a first voltage across at least one of said display elements, thereby to change a viscosity of the carrier medium; and
    (c) providing a second voltage across at least one of said display elements, thereby to cause at least one particle to move within the element, wherein the particles are substantially immobile under the second voltage without application of the first voltage.

2. The method of claim 1 wherein the first voltage is an AC voltage and the second voltage is a DC voltage.

3. The method of claim 1 wherein the first voltage represents a value of voltage below which the carrier medium has a high viscosity and substantially prevents particle movement and at or above which has a low viscosity and does not substantially prevent particle movement.

4. The method of claim 1 wherein the carrier medium comprises a polymer, thereby forming a gel for providing resistance to particle movement in the absence of the first voltage.

5. The method of claim 1 wherein the carrier medium comprises a floc structure, thereby forming a gel for providing resistance to particle movement in the absence of the first voltage.

6. The method of claim 1 wherein the plurality of display elements comprise at least two species of display element, each species of display element containing a different species of particle.

7. The method of claim 6 wherein the first voltage is different for each species of element such that each species of particle has a characteristic value of the first voltage above which characteristic value the species of particle moves when the second voltage is applied.

8. An electrophoretic display element exhibiting a voltage below which the element will not change condition, the display element comprising:
    an encapsulating wall;
    a plurality of particles disposed within the encapsulating wall, at least one of the plurality of particles responsive to an applied electric field; and
    a carrier medium disposed within the encapsulating wall, the carrier medium having a substantial resistance to particle movement under a second voltage and substantially lacking resistance to particle movement upon applying both the second voltage and a first voltage.

9. The method of claim 8 wherein the first voltage represents a value of voltage below which the carrier medium has a high viscosity and substantially prevents particle movement and at or above which the carrier medium has a low viscosity and does not substantially prevent particle movement.

10. The element of claim 8 wherein the carrier medium comprises a polymer, thereby forming a gel for providing resistance to particle movement at a voltage below the first voltage.

11. The element of claim 8 wherein the carrier medium comprises a floc structure, thereby forming a gel for providing resistance to particle movement at a voltage below the first voltage.

12. An electrophoretic display comprising two or more display elements of claim 8 wherein the display elements comprise at least two species of display element, each species of display element containing a different species of particle.

13. The display of claim 12 wherein the first voltage is different for each species of display element such that each species of particle moves at a different value of the first voltage when the second voltage is applied.

14. An electrophoretic display element exhibiting a voltage threshold below which the element will not change condition, the display element comprising:
    an encapsulating wall;
    a plurality of particles disposed within the encapsulating wall, at least one of the plurality of particles responsive to an applied electric field; and
    a carrier medium disposed within the encapsulating wall, wherein the carrier medium has a substantial resistance to particle movement at a voltage below a threshold voltage and substantially lacks resistance to particle movement at or above the threshold voltage such that at a voltage at or above the threshold voltage the particles exhibit movement at a velocity representing substantially a step-change in particle velocity relative to particle velocity at a voltage below the threshold voltage.

15. A method of threshold addressing an electrophoretic display, the method comprising the steps of:
(a) providing an electrophoretic display comprising a plurality of display elements, each of the display elements comprising:
an encapsulating wall;
a plurality of particles disposed within the encapsulating wall, at least one of the plurality of particles responsive to an applied electric field; and
a carrier medium disposed within the encapsulating wall; and
(b) providing a voltage of at least a threshold voltage across at least one of said display elements, thereby to cause at least one particle to move within the element, wherein the threshold voltage represents a value of voltage below which the carrier medium has a substantial resistance to particle movement such that the particles are substantially immobile and at or above which the carrier medium substantially lacks resistance to particle movement such that the particles move at a velocity representing substantially a step-change in particle velocity relative to particle velocity when the voltage is below the threshold voltage.

16. An electrophoretic display element exhibiting a voltage threshold below which the element will not change condition, the display element comprising:
an encapsulating wall;
a plurality of particles disposed within the encapsulating wall, at least one of the plurality of particles responsive to an applied electric field; and
a carrier medium disposed within the encapsulating wall, wherein the carrier medium has a substantial resistance to particle movement at a voltage below a threshold voltage and substantially lacks resistance to particle movement at or above the threshold voltage such that at or above the threshold voltage the particles exhibit movement at a velocity representing substantially a step-change in particle velocity relative to particle velocity at a voltage below the threshold voltage and wherein the particles move at a velocity that is non-linearly related to an applied voltage.

* * * * *